United States Patent
Lai et al.

(10) Patent No.: US 12,307,784 B1
(45) Date of Patent: May 20, 2025

(54) OBJECT DETECTION USING AUGMENTED DATA

(71) Applicant: Zoox, Inc., Foster City, CA (US)

(72) Inventors: Po-Jen Lai, Mountain View, CA (US); Shuangting Liu, Foster City, CA (US); Francesco Papi, Oakland, CA (US)

(73) Assignee: Zoox, Inc., Foster City, CA (US)

( * ) Notice: Subject to any disclaimer, the term of this patent is extended or adjusted under 35 U.S.C. 154(b) by 408 days.

(21) Appl. No.: 17/956,631

(22) Filed: Sep. 29, 2022

(51) Int. Cl.
*G06V 20/58* (2022.01)
*G06V 10/764* (2022.01)
*G06V 10/776* (2022.01)

(52) U.S. Cl.
CPC ............ *G06V 20/58* (2022.01); *G06V 10/764* (2022.01); *G06V 10/776* (2022.01)

(58) Field of Classification Search
CPC ..... G06V 20/58; G06V 10/776; G06V 10/764
See application file for complete search history.

(56) References Cited

U.S. PATENT DOCUMENTS

| | | |
|---|---|---|
| 11,450,117 B2 | 9/2022 | Goel et al. |
| 2023/0233072 A1* | 7/2023 | Haimovitch-Yogev ............... G06T 7/0012 351/209 |

OTHER PUBLICATIONS

Bagschik et al., "Scenario Simulation Execution Within a Truncated Parameter Space," U.S. Appl. No. 17/207,451, filed Mar. 29, 2021;53 pages Specification and 8 Figures.
Chu et al., "Determining Scene Similarity," U.S. Appl. No. 17/816,160, filed Jul. 29, 2022; 42 pages Specification and 11 Figures.

* cited by examiner

*Primary Examiner* — Sam Bhattacharya
(74) *Attorney, Agent, or Firm* — Lee & Hayes, P.C.

(57) ABSTRACT

Techniques for improving training data used to train a model to detect objects in an environment are disclosed. Portions of a dataset that are associated with significant operational conditions may be associated with indications of such conditions. The properties of these portions may be used to identify other portions of the dataset or other datasets for augmentation. Data in these portions of a dataset representing detections in an environment may be augmented generally, for example, by flipping geometric values and modifying associated data accordingly. Specific objects represented in such portions may also be augmented by determining particular objects that are represented in selected frames and channels and modifying the pixel values for pixels associated with such objects. The pixel values may be modified or zeroed based on various criteria. The resulting augmented data may be used to train a machine-learned model to more accurately detect objects in an environment.

20 Claims, 8 Drawing Sheets

OBJECT DETECTION USING AUGMENTED DATA

BACKGROUND

Various systems and techniques are utilized to perform detection of objects, such as vehicles, pedestrians, and bicycles, in an environment. For example, autonomous vehicles may be configured with various types of sensor systems that collect data in environments. Such sensor systems may include vision systems, lidar systems, radar systems, sonar systems, and the like. Various properties of that data captured in an environment by such systems can be used to generate data representing the presence and various characteristics of objects in the environment. Object characteristics and other aspects detected in an environment may be used to determine the location of an autonomous vehicle and/or objects in the environment, for example, for purposes of controlling the vehicle as it traverses the environment. However, some objects and/or their associated characteristics may be difficult to accurately identify and/or classify, for example due to environmental conditions, and may therefore present challenges to navigating a vehicle safely through an environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
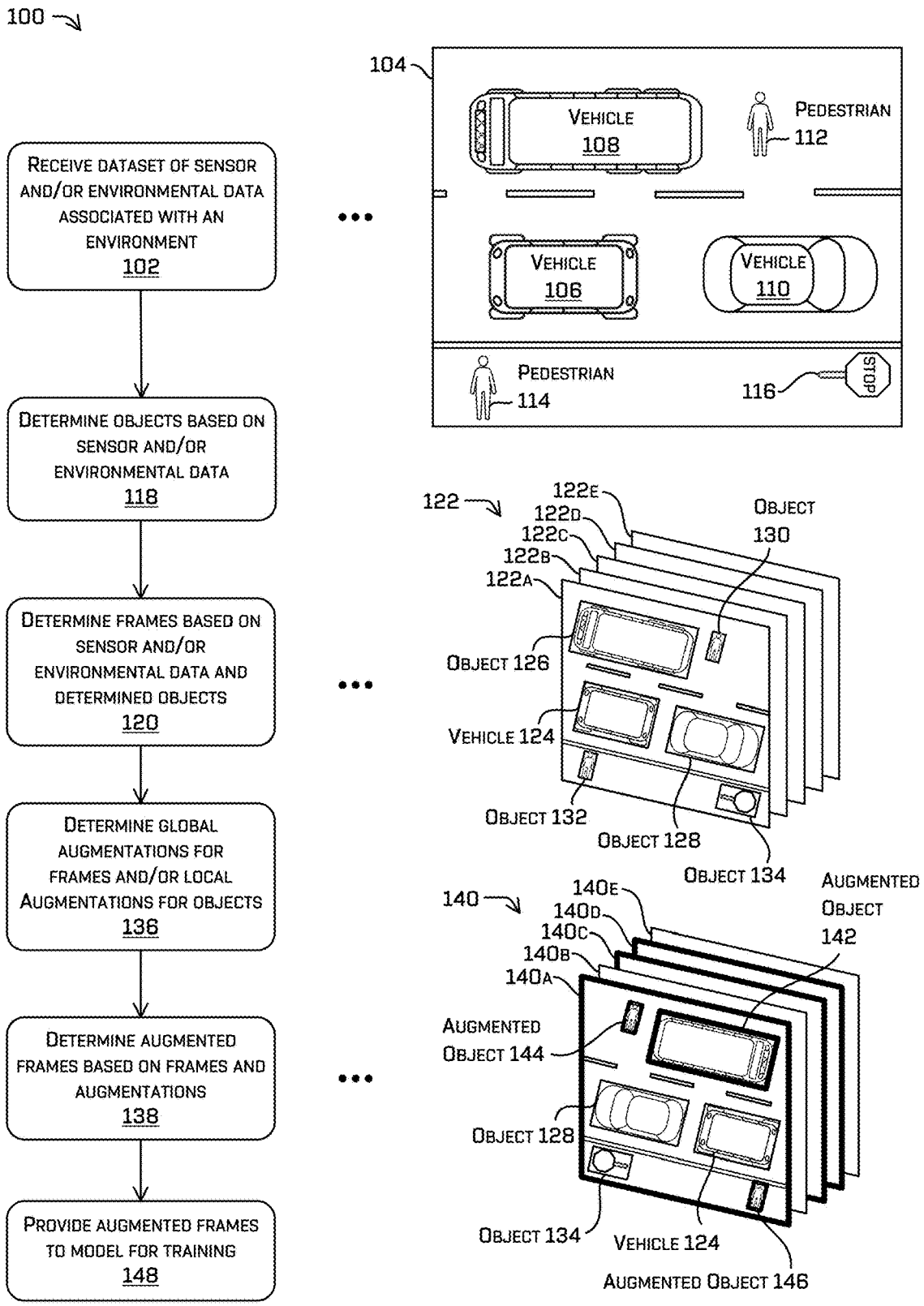
FIG. 1 is a pictorial flow diagram of an example process for performing data augmentation and determining training data for training a machine-learned model, in accordance with examples of the disclosure.

Techniques for generating datasets used to train models to perform object detections are discussed herein. A machine-learned model may be trained to detect objects in an environment. The output of such a model may include data that may be used by a vehicle computing system to determine a location, boundaries, and/or other properties of one or more objects in the environment. For example, object position data such as location, yaw, center, boundaries, etc. may be represented in and/or determined based on model output. Alternatively or additionally, object motion data such as velocity, acceleration, direction, etc. may be represented in and/or determined based on model output.

A vehicle may be configured with one or more sensors, such as image sensors (e.g., cameras), lidar sensors, radar sensors, sonar sensors, etc. that may capture sensor data representing an environment. In various examples, a vehicle may use this sensor data to determine objects in the environment and their associated characteristics. In some examples, data associated with multiple types of sensors may be used in object detection and/or the generation of data upon which object detection may be based. The vehicle may then use this object data as an input to one or more systems that may be configured to control the vehicle as it travels through an environment. However, some object data may be incomplete and/or inaccurate, rendering it less helpful in controlling the vehicle. For example, objects that are subject to unusual environmental conditions or circumstances may present object detection and/or classification challenges. For instance, an object that is partially obscured or occluded from a sensor (e.g., by bushes, trash, smoke, etc.) may be determined to be present in the environment based on sensor data collected by a vehicle computing system, but other data that may be useful in detecting and/or classifying the object and/or otherwise controlling the vehicle may be difficult to determine due to the partial occlusion of the object. Because examples of objects subject to various unusual circumstances that may inhibit accurate detection may be rare, it may be challenging to train a machine-learned model to detect such objects.

In various examples, a system may train a machine-learned model to automatically, more accurately, and more efficiently detect objects and features in data collected in an environment, including objects in unusual circumstances that may typically inhibit accurate detection. For example, a system may receive a dataset that includes data representing sensor data collected by multiple types of sensors within an environment and/or detections determined based on such sensor data. This data may be in the form of a multichannel data structure that may have multiple (e.g., two, three, four, or more) sensor channels with data associated with any one or more sensor types. In particular examples, the dataset may include two-dimensional scenes or frames representing aggregated sensor data for an environment at a particular time. Such frames or scenes may be top-down representations of a portion of an environment. The dataset may further include object property data, such as geometric data (dimensions, boundaries, center point, yaw, etc.), kinematic data (velocity, direction acceleration, etc.), feature data, non-geometric data, and/or any other data that may be associated with an object. The dataset may also, or instead, include object labeling and/or classification data (e.g., "pedestrian," "vehicle," bicycle," one or more associated label properties, etc.). The dataset may also, or instead, include sensor-related and/or sensor-specific data, such as radar cross-section ("RCS," also referred to as "radar signature") and/or signal-to-noise ratio ("SNR") for data associated with radar sensors; return distance, return distance, propagation time, and/or intensity for data associated with lidar sensors; timestamps associated with sensor data, etc.

Training data used as input for training machine-learned models to perform object detection may be based on from environmental data detected in real-world environments, such as sensor data and associated detections and segmentations determined by a vehicle traversing an operational environment. While many objects and aspects of an environment may be commonly represented in such environmental data (e.g., vehicles, pedestrians, bicycles, etc.), some objects and aspects may occur with relatively low frequency in real-world environments. For example, animals (horses, dogs, cats, etc.), unusual vehicles (horse-drawn carriages, motorcycle with sidecar, etc.), unusual scenarios and situations, and other relatively uncommon objects and aspects may not be frequently represented in environmental data. Therefore, these objects may not appear frequently in training data derived from such environmental data.

While the use of real-world environmental data is an effective means of training machine-learned models to detect objects and aspects in an environment, it is also important to train models to detect less common objects, aspects, and scenarios that may be present in an environment. In the disclosed systems and methods, training data (e.g., based on real-world environmental data) may be augmented to increase the utility of data representing uncommon objects, aspects, and/or scenarios in an environment. By augmenting less common objects, aspects, and scenarios in real-world environmental data to generate training data for a machine-learned model, the benefits of using real-world environmental data may be maintained while enhancing the training operations of the model to detect these less common objects, aspects, and scenarios.

In various examples, the system may determine or otherwise generate training data for use in training a machine-learned object detection model by augmenting the received dataset as described herein. In some examples, one or more aspects of the entirety of a particular portion of the data in the received dataset may be augmented. This may be referred to herein as "global" augmentation. For example, a portion of the dataset may be "flipped" or reversed about an axis. In such an example, the geometrical properties of a particular channel or portion of the dataset may be adjusted so that the positions of objects represented in that portion are reversed or otherwise changed to be the opposite of their former positions relative to an axis or a point in the frame. One or more non-geometrical properties may also be adjusted based on an axis or a point. In some examples, rather than flipping a frame, the system may translate and/or rotate a frame, for example based on various criteria, and may adjust other data and/or properties associated with the frame and/or objects represented therein based on such a translation and/or rotation.

For example, the dataset may include, or may be used to determine, one or more frames or scenes that individually represent a top-down view of an environment. These frames may include object data associated with one or more objects detected in the environment. These frames and the objects represented therein may be based on sensor data collected by multiple types of sensors. In such an example, the system may alter the coordinate or locational data associated with the environment so that the positions of objects and/or pixels representing the environment are reversed about a (e.g., physical or geometrical) a frame axis of a frame representing the top-down view of the environment. Other parameters associated with the objects and/or pixels may be changed accordingly. For example, velocity values for objects and/or pixels that have been flipped about an axis or point may be reversed (positive changed to negative and vice versa). Directional values (e.g., vectors) for such objects and/or pixels may be similarly reversed about such an axis or point. Any one or more other values that may be associated with objects and/or pixels represented in a dataset may also be adjusted based on a flipping of associated physical or geometrical properties. The resulting "flipped" frame or scene may then be used to train an object detection model, in some examples, after further augmentation is applied as described herein. In some examples, multiple frames or scenes (e.g., all frames or scenes) in a dataset may be globally augmented to generate a dataset of augmented data for training a machine-learned model. In some examples, rather than two-dimensional data such as frames or scenes, three-dimensional data representing an environment (e.g., voxels) may be flipped or otherwise augmented globally to generate such training data.

In various examples, in addition to, or instead of, global augmentation of frames, scenes, or other data structures in a dataset, particular portions of data in a received dataset may be augmented to generate training data for a machine-learned object detection model. This may be referred to herein as "local" augmentation. For example, one or more particular objects or types of objects represented in a dataset may be selected or otherwise determined for augmentation as augmentation objects. The augmentation objects may be mapped to a mask to mask out other data unrelated to such objects. The system may then determine particular properties and/or data associated with the augmentation objects (e.g., one or more particular channels with data associated with the augmentation objects) and/or particular portions of the dataset associated with the augmentations objects (e.g., one or more frames or scenes in which the augmentation objects may be represented). The system may then adjust the one or more pixel values associated with the determined object properties, object data, and/or portions of the dataset. In examples, one or more other values of one or more other types may also, or instead, be adjusted based on the augmentations determined herein, such as one or more values associated with a voxel, as one or more values associated with a point (e.g., in a point cloud, such as a lidar point cloud), as one or more values associated with a multichannel data structure, etc. In some examples, the system may "zero out" such pixels or otherwise modify the values of such pixels to be zero. In other examples, the system may instead, or also, sample input noise (e.g., based on a Gaussian distribution of input noise for a portion of the dataset) and add the sampled input noise to the pixel values of the pixels associated with the determined object properties, object data, and/or portions of the dataset.

For example, the dataset may include, or may be used to determine, one or more frames or scenes that individually represent a top-down view of an environment. These frames may include object data associated with one or more objects detected in the environment. These frames and the objects represented therein may be based on sensor data collected by multiple types of sensors. In such an example, the system may determine one or more objects in individual frames, for example, by determining one or more less common or rare objects and/or aspects represented in one or more of the frames as potential augmentation candidate objects. Additionally or alternatively, the system may randomly select a percentage, portion, or subset of objects represented in one or more of the frames as potential augmentation candidate objects. The system may then map the objects to a two-dimensional top-down object mask to isolate the candidate objects for potential augmentation and remove other objects have not been selected from consideration for augmentation.

The system may next determine, for the individual selected objects, a (e.g., random) number or percentage of channels associated with that object (e.g., channels associated with sensor modalities and/or data associated with particular types of sensors) and/or a (e.g., random) number or percentage of frames in which the object is represented. In some examples, the system may use one or more criteria instead of, or in addition to, random selection for determining one or more frames and/or channels as potential augmentation candidate frames/channels. The system may then adjust one or more pixel values for the selected objects that are associated with the selected channel(s) and represented in the selected frame(s).

In various examples, the system may perform this adjustment by changing a value of one or more (e.g., all) pixels associated with the determined augmentation object. Any one or more values that may be associated with a pixel or any other data associated with an object (e.g., voxel, point, etc.) may be adjusted based on the augmentations described herein. For example, one or more coordinate values (e.g., z value), other geometric values, kinematic values (e.g., velocity), other non-geometric values, intensity values, color values, and/or any other values that may be associated with an object or aspect may be adjusted in the augmentation techniques described herein.

In various examples, the system may adjust one or more such pixel values to zero (e.g., "zero-out" the one or more pixel values). The system may also, or instead, adjust such pixel values based on other data. For example, the system may sample the input noise associated with the selected channel(s) and/or frame(s) from a Gaussian distribution of such noise and add the sampled noise value(s) to a pixel value. The augmented pixels may then be used in frames or scenes of training data to train an object detection model, in some examples, after further augmentation is applied as described herein. In some examples, rather than two-dimensional object data, three-dimensional object data may be used and adjusted (e.g., voxels may be adjusted) to generate augmented objects that may be used in training data.

In various examples, pixel value augmentations may be determined individually or collectively (e.g., per object or frame). For example, the system may determine an individual Gaussian noise distribution sample for an individual pixel associated with a particular object to be augmented. The system may then determine another individual Gaussian noise distribution sample for another individual pixel associated with the same object to be augmented. Alternatively, the system may use a same Gaussian noise distribution sample for the one or more pixels associated with a particular object and/or in a particular frame determined to be augmented.

In various examples, particular object types in a dataset and/or portions of a dataset may be determined and augmented instead of, or in addition to, global augmentation and/or local augmentation of determined (e.g., less common or rare) objects. For example, one or more particular objects associated with a particular class of less common object that may typically be difficult to detect and/or classify properly (e.g., "pedestrian in a wheelchair," "pedestrian with an object," etc.) may be identified in a dataset for augmentation as augmentation objects. A binary mask may be determined for these objects wherein the pixel values associated with such objects is set to a particular value (e.g., 1) while the pixel values associated with other types of objects is set to another value (e.g., 0). This mask may then be used to augment the loss associated with such objects during the training pf the machine-learned object detection model. For example, the original loss for individual pixels in the training dataset may be multiplied by one plus the value associated with that pixel in the binary mask (e.g., loss=original_loss*(1+binary_mask_value)). In this way, the loss for objects in the determined particular class of objects may be augmented (e.g., doubled, where loss=original_loss*(1+binary_mask_value)=original_loss* (1+1)=original_loss*2), while the loss for other objects may not be affected by the binary mask (e.g., loss=original_loss* (1+binary_mask_value)=original_loss*(1+0)=original_ loss*1).

In various examples, augmentations may be determined based in part on one or more significant conditions that may be indicated in or otherwise associated with one or more portions of a dataset that may serve as a basis for augmented training data. As described herein, such datasets may include one or more multichannel data structures and/or other data structures that may include sensor data, environmental data, frames, two-dimensional scenes, other data representing aggregated sensor data for an environment, top-down representations an environment, object property, labeling, and/ or classification data, and/or any other data that may be collected and/or generated by a vehicle computing system and/or that may simulate any other data that may be collected and/or generated by a vehicle computing system. Among such data represented in a dataset may be one or more indications of significance of one or more particular portions of the dataset. As described in more detail herein, the system may determine or detect these indications and determine one or more properties of a portion of the dataset associated with such an indication. The system may then identify one or more portions of the dataset and/or portions of another dataset that may also be associated with such properties for augmentation. The system may then augment such portions (e.g., as described herein) to determine or generate an augmented dataset that may then be used to train a machine-learned model.

In various examples, the augmented dataset may be evaluated for effectiveness as a training dataset. For example, a machine-learned model trained using the augmented dataset may be executed using a set of parameterized scenarios to generate simulation results that may include, or be used to determine, safety metrics (e.g., indicating success of detection of collisions, injuries, obstacle intersections, etc.). These safety metrics may be compared to one or more threshold safety metrics. The machine-learned model trained using the augmented dataset may be considered validated for those safety metrics that have met such threshold safety metrics.

Alternatively or additionally, the machine-learned model may be evaluated based on past simulation results using other (e.g., non-augmented) data to determine whether the augmented dataset has improved the performance of the model. For example, the machine-learned model trained using the augmented dataset may be executed using a set of parameterized scenarios to generate simulation results that may include, or be used to determine, safety metrics. These safety metrics may be compared to the safety metrics resulting from one or more previous executions of the machine-learned model using the corresponding non-augmented dataset and/or one or more other datasets. The machine-learned model trained using the augmented dataset may be evaluated based on whether the safety metrics of that version of the machine-learned model have improved over the safety metrics of the machine-learned model trained using non-augmented and/or other datasets. If so, the augmented dataset may be considered an improved training dataset over the others. Any other types of metrics may also, or instead, be used to evaluate a machine-learned model executed using a dataset augmented as described herein. Examples of evaluating the performance of a machined-learned model based on various metrics are provided in U.S. patent application Ser. No. 17/207,451, filed Mar. 29, 2021, entitled "Scenario Simulation Execution within a Truncated Parameter Space," the entirety of which is incorporated herein by reference for all purposes.

In examples, a dataset may include data collected during real-world operation of a vehicle in an environment. This data may include one or more indications of a significant condition that may be associated with a particular portion of the dataset. For example, an indication of significant condition may be generated and/or stored in a dataset based on a transmission of a request for remote human control of the vehicle. For instance, if a vehicle computing system has detected a vehicle condition or other situation in which it is unable to independently control the vehicle (e.g., collision, obstacle, safety hazard, malfunction, etc.), the vehicle computing system may transmit a request to a remote (e.g., human) operator for assistance and/or for manual remote control of the vehicle. During or temporally proximate to the transmission of this request, the vehicle computing system may store and/or transmit an indication that the request was sent (e.g., in logging data). Other significant conditions may also be indicated, such as a collision, an intersection with an object, a vehicle malfunction, and/or any other unusual, uncommon, or rare situation.

In examples, such indications may be generated and/or stored (e.g., automatically) by a vehicle computing system and/or other system when a triggering significant condition is detected. Alternatively or additionally, such indications may be manually added to a dataset, for example, by a human operator evaluating the dataset. Indications may be general, indicating that a portion of a dataset (e.g., frame, top-down representation at a particular time, etc.) is significant and/or more specific, indicating a type of significant condition and/or other specific data that may be associated with a specific condition.

An indication of a significant condition may be associated with a portion of the dataset that may be associated with a same or proximate time at which the indication was stored or generated. For example, an indication of a significant condition of transmitting a request to a remote operator may be associated with one or more frames generated using sensor data collected at or around the time that the indication was generated, a portion of a data structure containing object labels and other object data for objects detected in the environment at or around the time that the indication was generated, a portion of a channel in a multichannel data associated with an approximate time that the indication was generated, a portion of a path of travel in the environment through which the vehicle was traveling at or around the time that the indication was generated, etc.

The system may determine one or more properties based on the portion of the dataset associated with an indication of a significant condition. For example, the system may determine a vehicle position in the environment and/or relative to one or more objects detected in the environment based on (e.g., at the time associated with) that portion of the dataset, one or more labels or classifications of objects detected in the environment based on (e.g., at the time associated with) that portion of the dataset, environmental, vehicle, and/or other operating conditions based on (e.g., at the time associated with) that portion of the dataset, etc. In examples, the system may determine such properties relatively directly from the portion of the dataset. For example, the system may determine objects represented in a frame that also includes an indication of a call to a remote operator. Alternatively or additionally, the system may determine such properties based on data determined from the portion of the dataset. For example, the system may determine a time associated with a frame that includes an indication of a call to a remote operator and then determine, for example from a multichannel data structure, other data (e.g., object labels, object data, sensor data, etc.) associated with that time from one or more channels.

Using one or more of such determined properties, the system may then determine portions of the same dataset and/or of one or more other datasets that may be associated with similar properties for augmentation. For example, the system may determine one or more frames in a dataset (e.g., the same dataset or another dataset) that include the same or substantially similar objects, vehicle position, environmental conditions, etc., that are associated with a frame that was associated with an indication of a significant condition. The system may then augment such frames in the same and/or other dataset as described herein to generate training data that the system may then provide for training a machine-learned model. The model, once trained using this augmented data, may then be evaluated to determine whether the augmented data has provided an improvement in the performance of the model (e.g., based on safety metrics) and/or has trained the model to meet one or more performance criteria (e.g., threshold safety metrics).

In an illustrative, non-limiting example, a dataset may include data collected during real-world operation of a vehicle and/or data simulating a period of real-world operation of a vehicle. The dataset may include frames and other data that may be associated with a vehicle traversing an environment. At a particular point in time, the vehicle may have intersected with a road barrel, which may be a condition under which the vehicle may be configured to transmit a request to a remote operator for manual assistance. The dataset may include an indication of this transmission for assistance associated with one or more particular frames generated at and around the time of the transmission. In this example, the system may detect this indication and determine, as properties of the frames associated with the indication, the types of objects represented in the frames, the position of the vehicle relative to the objects at that time, a vehicle velocity at that time, and a vehicle acceleration at that time.

Continuing this example, the system may then determine one or more frames in the same dataset and/or another dataset that also include all, or a subset of, the properties of the frames associated with the indication. For example, the system may identify one or more frames with at least one or more of the same types of objects oriented in a similar manner to the vehicle as in the frames associated with the indication and where the vehicle is operating at a similar velocity and acceleration as in the frames associated with the indication. The system may then augment these determines frames (e.g., locally, globally, geometrically, non-geometrically, etc. as described herein) to generate an augmented dataset that may be used for training a machine-learned model and that may be evaluated against prior models trained using different dataset and/or other criteria.

In general, the disclosed techniques can be used to identify cases wherein a machine-learned model (e.g., for use on an autonomous vehicle) may have difficulties reacting with certain scenarios wherein the scenarios may not be well represented in a dataset used to train the machine-learned model. These difficulties may be evidenced using simulations wherein certain scenarios may be tagged for further analysis due to a collision detection, a simulated autonomous vehicle acting erratically, an autonomous vehicle simulating a request for human assistance for pathing, etc. The difficulties may also be evidenced via a physical autonomous vehicle encountering any of the preceding conditions regarding the simulation. Techniques for determining scene similarity are disclosed in U.S. patent application Ser. No. 17/816,160, filed on Jul. 29, 2022, titled "Determining Scene Similarity" which is incorporated herein in its entirety and for all purposes. In response to detecting difficult scenarios for machine-learned model(s) of the vehicle, the disclosed techniques may be used to augment features of similar scenarios to train a machine-learned model to better react to similar scenarios.

Determining similarity between difficult scenarios and scenarios in a training dataset can be determined based on various metrics. For example, one or more scenes (of which a scenario may contain several over time) of a difficult scenario can be analyzed to determine classifications of objects contained therein, their locations, their relative positions or proximities between each other or the autonomous vehicle, weather conditions, road topologies, time of day, geographic location, and/or routes of objects over time. These features can be thresholded to determine similar scenes or scenarios within a dataset to train a machine-learned model. In some examples, a scene or scenarios can be parameterized and represented in vector space and thresholding can similarly be used to determine similar scenarios. In examples, some features can be selected based on certain rules/criteria to determine similar scenes/scenarios. For example, agent locations/classifications within a certain proximity to a vehicle may be vectorized. As another example, perhaps all examples, within a geographic proximity may be vectorized. Once similar scenes/scenarios within a dataset are located, the disclosed techniques herein can be used to augment features of those scenes/scenarios such that those scenes/scenarios are better represented in the dataset.

In some examples, similarities between multiple difficult scenarios may be determined. For example, it may be determined that multiple scenarios may correspond to a certain maneuver (e.g., an unprotected left turn), a certain location, a certain weather condition, a certain type/classification of object/vehicle, etc. These common features between multiple difficult scenes/scenarios can be used to find corresponding scenes/scenarios within a dataset as discussed above. These techniques can be used to better balance a dataset for training a machine learned model (e.g., for use with an autonomous vehicle).

In various examples, the system may generate or otherwise determine augmented frames or other data structures to determine a training dataset that includes the augmentations described herein. For example, the system may modify the received dataset (e.g., the frames or data structures in the received dataset) with one or more of the augmentations determined as described herein. The system may then provide this modified dataset as an augmentation dataset for training an object detection machine-learned model. Alternatively or additionally, the system may generate a new dataset (e.g., new frames or data structures) with one or more of the augmentations determined as described herein. The system may include in the new dataset both augmentation data (e.g., augmented frames, objects, object data, etc.) and non-augmented or original data (e.g., non-augmented frames, objects, object data, etc. from the received dataset). The system may then provide this newly generated dataset as a dataset for training an object detection machine-learned model The system may provide an augmented dataset as a training dataset to train a machine-learned model to improve object detection operations. In some examples, the augmented dataset may again be augmented as described herein to further improve the training data that may be used to train such a model. In various examples, these dataset augmentation operations may be performed repeatedly until a threshold number of iterations of the disclosed techniques has been performed and/or until one or more other criteria is met.

In various examples, a machine-learned model trained as described herein may be executed by one or more of various components that may be configured in an autonomous vehicle, including perception components and/or individual sensors (e.g., lidar, sonar, radar, vision, time of flight, etc.), and/or one or more associated components. Such a model may be used to determine data that may be combined with or otherwise used in conjunction with other data (e.g., map data) to determine a location of a vehicle, a vehicle trajectory, a vehicle route, one or more vehicle controls, and/or any other data that may include or make use of object detection data.

The resulting augmented data determined using the disclosed techniques, including object data, detection data, pixel data, frame data, and/or any associated data, may be used to train one or more machine-learned models to preform various operations. For example, dataset including augmented data determined as described herein may be used as training data and/or ground truth data for further training a machine-leaned model to improve object detection operations. Examples of training a machined-learned model and performing object detection operations are provided in U.S. patent application Ser. No. 17/215,938, filed Mar. 29, 2021, entitled "Hierarchical Machine-Learning Network Architecture," the entirety of which is incorporated herein by reference for all purposes.

When a machine-learned model trained according to the disclosed techniques is executed in a vehicle computing system, the model may perform one or more object detection operations that may be used to control the vehicle. For example, using a machine-learned model trained as described herein, a vehicle computing system may detect unusually situated or uncommon objects more accurately by using multi-modal sensor data. Using the augmented data for training as described herein may improve the functioning of the model during execution by exposing the model to more data associated with less common and/or unusual object situations and conditions. By increasing the exposure to data associated with such objects, the model may be trained to better detect such object. Such a model may then be better able to detect and/or accurately classify such objects during execution by a vehicle computing system controlling a vehicle in an operational environment. Such a vehicle computing system may perform object detection in the environment and generate or adjust a vehicle trajectory based on such detections. For example, the vehicle computing system may adjust or generate a trajectory to control the vehicle within an environment to avoid detected objects and/or take other appropriate actions regarding such objects based on executing an improved object detection model trained as described herein.

The systems and techniques described herein may be directed to leveraging machine-learned models, sensor data, and associated data to improve object detection operations performed by a vehicle, such as an autonomous vehicle, in an environment. More specifically, the disclosed systems and techniques may be directed to facilitating more accurate detection of objects and determinations of object data and reducing the processing of data that does not contribute to object detection operations. Using this improved data, such a vehicle may generate safer and more efficient trajectories for use in navigating through an environment. In particular examples, the systems and techniques described herein can utilize sensor data and/or training datasets based on sensor data to train machine-learned models to more accurately and efficiently detect objects in an environment for use in determining a vehicle control data. The examples described herein may result in increased certainty and accuracy in object detection operations, thereby allowing an autonomous vehicle to generate more accurate and/or safer trajectories for the autonomous vehicle to traverse in the environment.

For example, techniques described herein may increase the reliability of performing object detection in an environment, reducing the likelihood of inaccurately identifying or classifying an object or of failing to detect an object. That is, the techniques described herein provide a technological improvement over existing object detection and vehicle tracking and/or navigation technology. In addition to improving the accuracy of object detections, the systems and techniques described herein can provide a smoother ride and improve safety outcomes by, for example, more accurately providing safe passage to an intended destination through an environment using more accurate object data. Moreover, the systems and techniques may prevent unnecessary braking or hard-braking to avoid objects that could otherwise have been smoothly avoided if more accurate object data were available.

The techniques described herein may also improve the operation of computing systems and increase resource utilization efficiency. For example, computing systems, such as vehicle computing systems, may more efficiently perform object detection using one or more machine-learned models trained according to the techniques described herein because, by recognizing and reducing the data processed by such a model perform object detections operations (e.g., for objects that may typically be less common and/or more difficult to accurately detect), the disclosed examples may reduce the amount of processing required to perform such detections. The disclosed examples may also reduce the data processing required to perform object detections because the machine-learned models trained according to the disclosed examples may provide more relevant data to planning and perception operations, which may in turn increase the accuracy of vehicle trajectory determinations, thereby reducing the need to correct and/or repeat trajectories (e.g., by the same or other systems and processes) determined by a vehicle computing system. This reduction in extraneous processing therefore increases the overall efficiency of such systems over what would be possible using conventional techniques. Moreover, the techniques discussed herein may reduce the amount of data used by computing systems to detect objects and perform trajectory determination operations as the amount of data processed in such operations may be reduced due to improved recognition of relevant objects, which may reduce latency, memory usage, power, time, and/or computing cycles required to detect objects in an environment.

The systems and techniques described herein can be implemented in several ways. Example implementations are provided below with reference to the following figures.

Although discussed in the context of an autonomous vehicle, the techniques described herein can be applied to a variety of systems (e.g., a sensor system or a robotic platform) and are not limited to autonomous vehicles. For example, the techniques described herein may be applied to semi-autonomous and/or manually operated vehicles. In another example, the techniques can be utilized in an aviation or nautical context, or in any system involving objects or entities for which object detection data is obtained or desired and/or in which machine-learned models are used. Further, although discussed in the context of particular types of data and detection using particular types of sensors, any suitable types of sensors and emitters are contemplated, as well as other types of sensor data (e.g., cameras, lidar, sonar, radar, ultrasonic, time of flight, infrared, etc.). Furthermore, the disclosed systems and techniques may include using various types of components and various types of data and data structures, including, but not limited to, various types of image data and/or other sensor data (e.g., stereo cameras, time-of-flight data, radar data, sonar data, lidar data, and the like). For example, the techniques may be applied to any such sensor systems. Additionally, the techniques described herein can be used with real data (e.g., captured using sensor(s)), simulated data (e.g., generated by a simulator), or any combination of the two.

Figure 5:
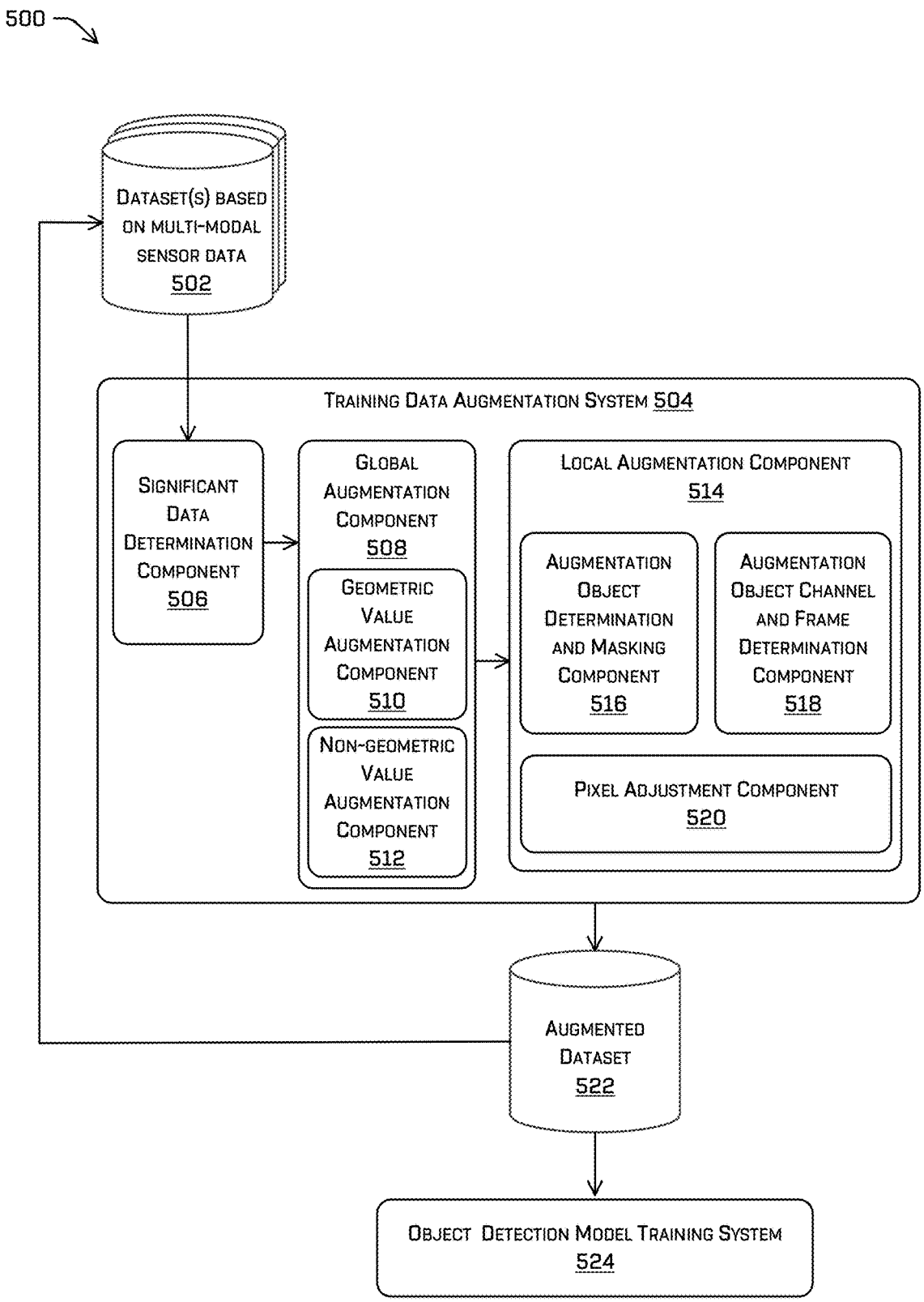
FIG. 5 is a block diagram of an example data augmentation system for determining augmented data for an object detection model training system, in accordance with examples of the disclosure.
Figure 8:
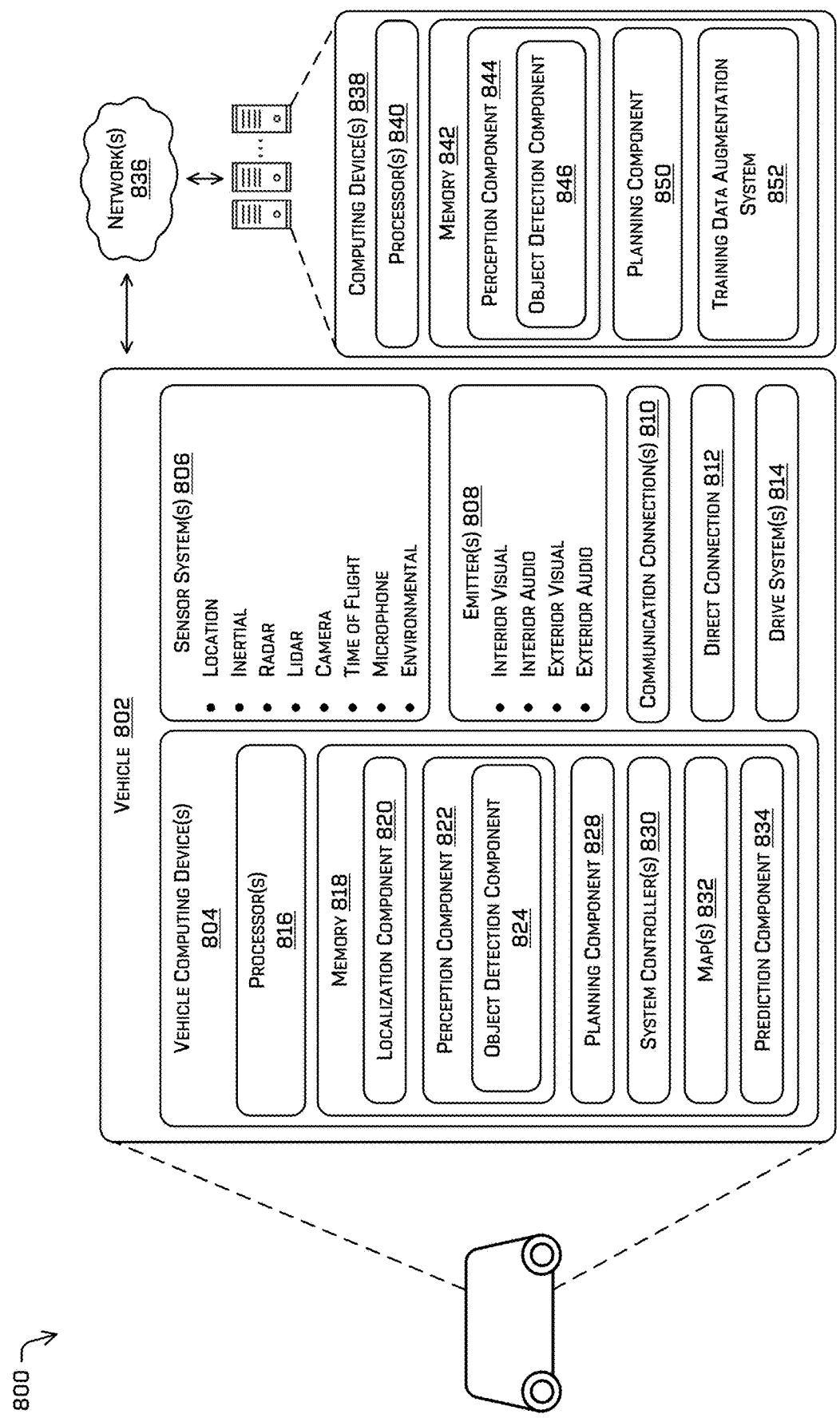
FIG. 8 is a block diagram of an example system for implementing the techniques described herein.

FIG. 1 is a pictorial flow diagram of an example process 100 for training a machine-learned model to improve object detections performed at a vehicle that may be operating in an environment by augmenting a training dataset based on characteristics of the data in the dataset and using this augmented data to train the model. In some examples, one or more operations of the process 100 may be implemented by a vehicle computing system and/or by a machine-learned model training system, such as by using one or more of the components and systems illustrated in FIGS. 5 and 8 and described below. For example, one or more components and systems can include those associated with one or more of the one or more sensor systems 806, the perception component 822, and/or the planning component 828. In some examples, the one or more operations of the process 100 may also, or instead, be performed by system 504 of FIG. 5 and/or one or more components associated therewith. In some examples, the one or more operations of the process 100 may also, or instead, be performed by a remote system in communication with a vehicle, such as the perception component 844 and/or planning component 850 of the computing device(s) 838 illustrated in FIG. 8. Such processes may also, in turn, be performed by the device itself (e.g., using onboard electronics) such that a standalone device may produce such signals without the need for additional computational resources. In still other examples, the one or more operations of the process 100 may be performed by a combination of a remote system and a vehicle computing systems. However, the process 100 is not limited to being performed by such components and systems, and the components and systems of FIGS. 5 and 8 are not limited to performing the process 100.

At operation 102, a training dataset may be received at a machine-learned model training and/or execution system (e.g., a vehicle computing system). In particular examples, this training dataset may include data associated with and/or determined based on multiple sensor types, such as vision, sonar, radar, lidar, etc. This data may be in the form of one or more multichannel data structures that may have multiple channels, individual channels of which may be associated with a particular sensor type. The data in the dataset may also, or instead, include or be used to determine one or more two-dimensional scenes or frames, such as one or more two-dimensional frames representing a top-down view of a portion of an environment that may be associated with a vehicle. The dataset received at operation 102 may also include object data associated with objects detected in the environment and/or other types of detection data (e.g., feature detection data, surface and/or edge detection data, detection data associated with other physical aspects of the environment, environmental condition data, timestamps, etc. Object data may include geometric data (e.g., position and/or location in the environment, center, dimensions, yaw, etc.), kinematic data (e.g., velocity, direction of motion, acceleration, etc.), classification data (e.g., one or more classed or categories associated with the object, one or more probabilities associated with a classification, etc.), sensor- and/or channel-related object data (e.g., timestamp of sensor data collection, intensity data, occlusion data, etc.), and/or any other data that may be associated with an object. In some examples, the dataset may also, or instead, include ground truth data (e.g., ground truth annotations). In examples, the dataset may represent data collected by one or more sensors configured at a vehicle in an operational (e.g., real-world) environment and/or simulated data. In some examples, individual frames represented in the dataset may have any number of features and/or aspects that may differ from those of one or more other frames.

An example 104 illustrates a top-down view of a portion of an environment that may be represented in a dataset such as that received at operation 102, for example, by a frame included in or otherwise determined from such a dataset. A vehicle 106 may represent a vehicle associated with the dataset (e.g., a vehicle that may have collected the sensor data used to generate the dataset). Vehicles 108 and 110 may also be within this portion of the environment, as well as pedestrians 112 and 114. Other objects, such as a stop sign 116, may also be within the environment of example 104.

At operation 118, the system may determine one or more objects represented in the dataset received at operation 102. For example, the dataset may include object data for one or more objects in the environment determined based on one or more types of sensor data. Alternatively or additionally, the dataset may include data that the system may use to detect objects in the environment and/or otherwise determine object data for objects in the environment.

At operation 120, the system may determine frame(s) based on the dataset. For example, the dataset may include one or more frames representing one or more respective top-down views of a portion of an environment. Alternatively or additionally, the dataset received at operation 102 may include one or more multichannel data structures associated with various sensor modalities that may have been used to collect and/or determine the data associated with such data structures. The system may use these multichannel data structures to determine one or more two-dimensional frames that may be used as augmentations candidate frames.

Example frames 122 illustrate a plurality of frames 122a-e that may individually represent a top-down view of a portion of an environment that may be represented in, or determined based on, a dataset such as that received at operation 102. For example, individual frames of the frames 122 may be associated with sensor data collected in the environment of example 104 at different times. The example frames 122 may have associated object data. For example, the vehicle 106 in the environment of example 104 may be represented as a vehicle object 124 in the example frame 122a. Objects 126, 128, 130, 132, and 134 may also be represented in the frame 122a. These objects may correspond to vehicles 108 and 110, pedestrians 112 and 114, and stop sign 116 of the example 104, respectively. In some examples, the objects 126, 128, 130, 132, and 134 may have associated object data that may be associated with the frame 122a and/or one or more of the other example frames 122. For example, one or more of such objects may have associated channel data, classification data, geometric data, and/or kinematic data included on or associated with one or more of the example frames 122.

At operation 136, the system may determine global augmentations for the frames determined at operation 120. For example, the system may flip one or more of the frames determined at operation 120 about a particular center axis in the two-dimensional dace represented by such frames (e.g., the y axis or the x axis). In such an example, the geometrical properties objects represented in such frames may be in the dimension associated with the axis about which the frame may be flipped, or otherwise adjusted so that the objects are on the opposite portion of the frame relative to the selected axis. One or more non-geometrical properties may also be adjusted based on the selected flip axis. For example, kinematic values may be adjusted so that the motion properties associated with objects are retained and correspond to the flipped frame (e.g., so that data associated with an object in motion still indicates that the object is in motion but is moving in the opposite direction at an opposite velocity compared to its original object data). In various examples, any properties associated with an object and/or frame may be adjusted based on a frame flip, including any data associated with one or more perception state vectors. In some examples, rather than flipping a frame, at operation 136 a frame may be translated and/or rotated based on various criteria. The associated object and/or environmental data may also be adjusted based on such translation, rotation, or other frame adjustment.

Further at operation 136, the system may determine local augmentations for the objects determined at operation 118. For example, the system may select a percentage or a number of the objects represented in one or more of the frames. This selection may be random or may be based on one or more criteria. The system may then map the selected objects to a two-dimensional top-down object mask for potential augmentation. The system may next determine, for individual selected objects, a number or percentage of channels associated with one or more frames and a number or percentage of such frames. This determination may also be random or may be based on one or more criteria. Next, the system may determine one or more pixels in the frames that correspond to the determined channel(s), frame(s), and selected object(s).

Continuing with operation 136, the system may adjust the pixel values for these determined pixels. In various examples, the system may zero out the value for such pixels or otherwise assign them a value so that they are not used in training the model. Alternatively or additionally, the system may adjust such pixel values based on other data, such as sampled noise associated with the selected channel(s) and/or frame(s). The system may add this noise value to the pixel value for the determined pixels. The augmented pixels e.g., zeroed out pixels and/or noise augmented pixels) may then be used in frames in a training dataset.

Further at operation 136, the system may also, or instead, determine particular object types in a dataset and determine a binary mask that may be used to set the pixel values associated with such objects is set to a particular value (e.g., 1) and the pixel values for pixels associated with other types of objects to another value (e.g., 0) so that the loss of the determined particular types of objects is emphasized in the training data, as described above.

At operation 138, the system may determine the augmented frames to be used in the augmented training dataset. For example, the system may modify one or more frames included in or otherwise based on the dataset received at operation 102 to represent the augmentations determined at operation 136. In some examples, the system may modify one or more multichannel data structures included in or otherwise based on the dataset received at operation 102 based on the augmentations determined at operation 136. Alternatively or additionally, the system may determine or otherwise generate a new or distinct dataset including frames representing the augmentations determined at operation 136, in some examples, also including other data that may have been included in the dataset received at operation 102. Alternatively or additionally, the system may determine or otherwise generate one or more new or distinct multichannel data structures for a new dataset based on and/or including frames representing the augmentations determined at operation 136, in some examples, also including other data that may have been included in the dataset received at operation 102.

Example augmented frames 140 illustrate a plurality of augmented frames 140a-e that may individually represent a top-down view of a portion of an environment that may be represented in, or determined based on, a dataset such as that received at operation 102 and augmented as described herein, for example, at operation 136. As can be seen in this example, the frame 140a may have been determined using global augmentation by flipping the frame 122a about its y axis. As can be further seen in this example, augmented objects 142, 144, and 146 may have been locally augmented based on objects 126, 130, and 132 of frame 122a, respectively, while the remaining objects 128 and 134 of frame 122a may not have been selected for local augmentation. Other data, including object data (e.g., geometric data, kinematic data, classification data, etc.) may have been adjusted based on such augmentations.

At operation 148, the augmented frames and/or data may be provided to a machine-learned model training system for training a model to perform object detection operations.

Figure 2:
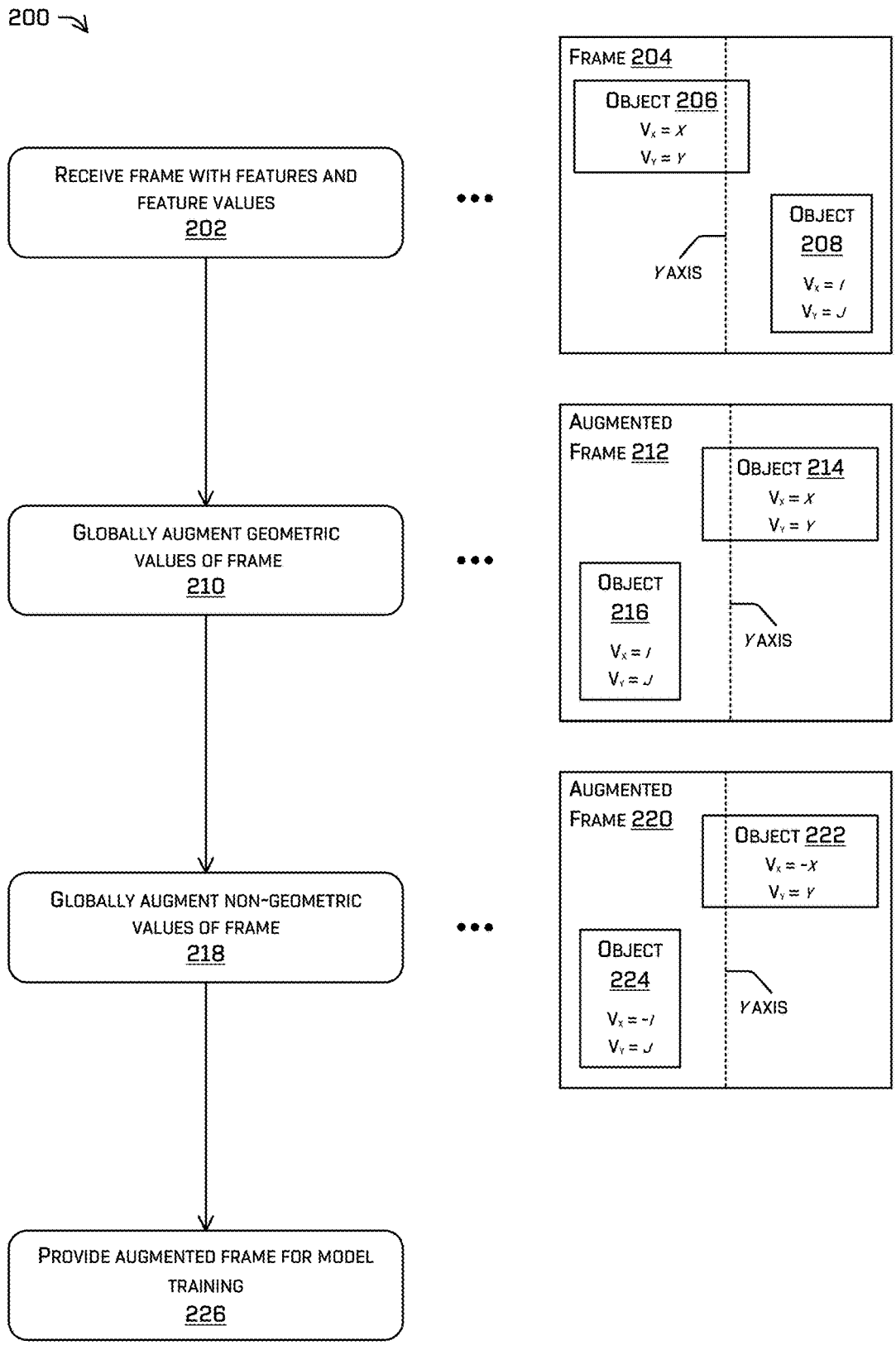
FIG. 2 is a pictorial flow diagram of another example process for performing data augmentation and determining training data for training a machine-learned model, in accordance with examples of the disclosure.

FIG. 2 is a pictorial flow diagram of an example process 200 for training a machine-learned model to improve object detections performed at a vehicle that may be operating in an environment by globally augmenting a frame and using this augmented frame to train the model. In some examples, one or more operations of the process 200 may be implemented by a vehicle computing system and/or by a machine-learned model training system, such as by using one or more of the components and systems illustrated in FIGS. 5 and 8 and described below. For example, one or more components and systems can include those associated with one or more of the one or more sensor systems 806, the perception component 822, and/or the planning component 828 of FIG. 8. In some examples, the one or more operations of the process 200 may also, or instead, be performed by system 504 of FIG. 5 and/or one or more components associated therewith. In some examples, the one or more operations of the process 200 may also, or instead, be performed by a remote system in communication with a vehicle, such as the perception component 844 and/or planning component 850 of the computing device(s) 838 illustrated in FIG. 8. Such processes may also, in turn, be performed by the device itself (e.g., using onboard electronics) such that a standalone device may produce such signals without the need for additional computational resources. In still other examples, the one or more operations of the process 200 may be performed by a combination of a remote system and a vehicle computing systems. However, the process 200 is not limited to being performed by such components and systems, and the components and systems of FIGS. 5 and 8 are not limited to performing the process 200.

At operation 202, a frame may be received that includes one or more features and/or data associated with such features. Such features may include or represent one or more objects, while the feature data may include object data associated with such one or more objects. However, features are not limited to objects and objects are not required to be among such features. The frame received at operation 202 may represent a two-dimensional top-down view of an environment associated with a vehicle. In some examples, the frame received at operation 202 may be included in a training dataset as described herein. Alternatively or additionally, the received frame may be determined based on a dataset that, for example, includes one or more multichannel data structures representing sensor data and/or other types of data included in a training dataset. For example, a training dataset including such a frame may be received at a machine-learned model training and/or execution system (e.g., a vehicle computing system). In particular examples, the received frame and associated data may include data corresponding to multiple sensor types, such as vision, sonar, radar, lidar, etc.

An example frame 204 illustrates a top-down view of a portion of an environment that may be represented in a dataset. Objects 206 and 208 may be represented in the frame 204. These objects may have associated object data (e.g., velocity parameters $v_x$=x and $v_y$=y for object 206 and $v_x$=i and $v_y$=j for object 208). The objects may be oriented in the example frame about a y axis as shown.

At operation 210, the system may globally augment the geometric features of a frame. For example, the system may modify the coordinates, dimensions, location data, position data (center, yaw, coordinates, etc.), and any other physical aspects of particular features to determine an augmented frame such that the augmented frame is substantially the reverse or opposite orientation of the original frame. Such modifications may be performed with respect to a particular point or axis of the frame. For example, the system may modify geometric parameters of objects and features in a frame such that they are flipped about the x or y axis of the frame. Alternatively or additionally, the system may modify geometric parameters of objects and features in a frame such that they are rotated about a particular point in the frame. Alternatively or additionally, the system may modify geometric parameters of objects and features in a frame such that they are translated based on one or more criteria (e.g., moved horizontally and/or vertically by a particular distance). Other modifications of geometric parameters of features and/or objects in a frame may also, or instead, be used to augment a frame as described herein.

An example augmented frame 212 illustrates the geometric modifications made to the example frame 204 in performing an example global frame augmentation. As can be seen in this example, the geometric data of objects 206 and 208 may have been modified with augmented geometric data to determine objects 214 and 216, respectively, flipping these objects in the frame about the y axis. In this example, the geometric data of these objects has been modified but no other data (e.g., kinematic data), therefore in this partial global augmentation, the associated object data remains the same as in example frame 204 (e.g., velocity parameters $v_x=x$ and $v_y=y$ for object 206 and $v_x=i$ and $v_y=j$ for object 208).

At operation 218, the system may globally augment one or more other non-geometric features of the frame. For example, the system may modify the kinematic features of the augmented frame with augmented kinematic data such that those features are also adjusted based on the physical orientation adjustment of the original frame. Here again, such modifications may be performed with respect to a particular point or axis of the frame. For example, the system may modify kinematic parameters of objects and features in a frame such that they are flipped about the x or y axis (or some arbitrary point or frame of reference) of the frame (e.g., an object in a flipped augmented frame moves in the opposite direction at an opposite velocity relative to the flip axis). Alternatively or additionally, the system may modify kinematic parameters of objects and features in a frame such that they are rotated about a particular point in the frame (e.g., a direction of motion of an object in a rotated augmented frame (e.g., 90 degrees) is also rotated in substantially the same manner as the augmented frame (e.g., 90 degrees)). Alternatively or additionally, the system may modify kinematic parameters of objects and features in a frame such that they are translated based on one or more criteria (e.g., adjusted horizontally and/or vertically by a particular distance). Other modifications of kinematic and other non-geometric types of parameters of features and/or objects in a frame may also, or instead, be used to augment a frame as described herein.

An example augmented frame 220 illustrates the kinematic modifications made to the example augmented frame 212 based on example frame 204 in performing an example global frame augmentation. As can be seen in this example, the kinematic data of objects 214 and 216 may have been modified to determine objects 222 and 224, respectively, (e.g., velocity parameters $v_x=-x$ and $v_y=-y$ for object 222 and $v_x=-i$ and $v_y=-j$ for object 224) adjusting such parameters to reflect the physical flipping of these objects in the frame about the y axis of the frame (e.g., reversing the x axis velocity parameters). In this example, both the geometric and the kinematic data of these objects has been modified, therefore completing the global augmentation of the example frame 204 to determine the augmented frame 220. In other examples, other non-geometric data associated with such objects may also, or instead, be modified with augmented non-geometric data.

At operation 226, the globally augmented frame and/or associated data may be provided to a machine-learned model training system for training a model to perform object detection operations. In various examples, the augmented frame may be included in a dataset that includes one or more other frames and/or may be used to generate such a dataset. In other examples, the augmented frame may be used, for example along with one or more other augmented frames, to generate a multichannel data structure that may be used to train a model.

Figure 3:
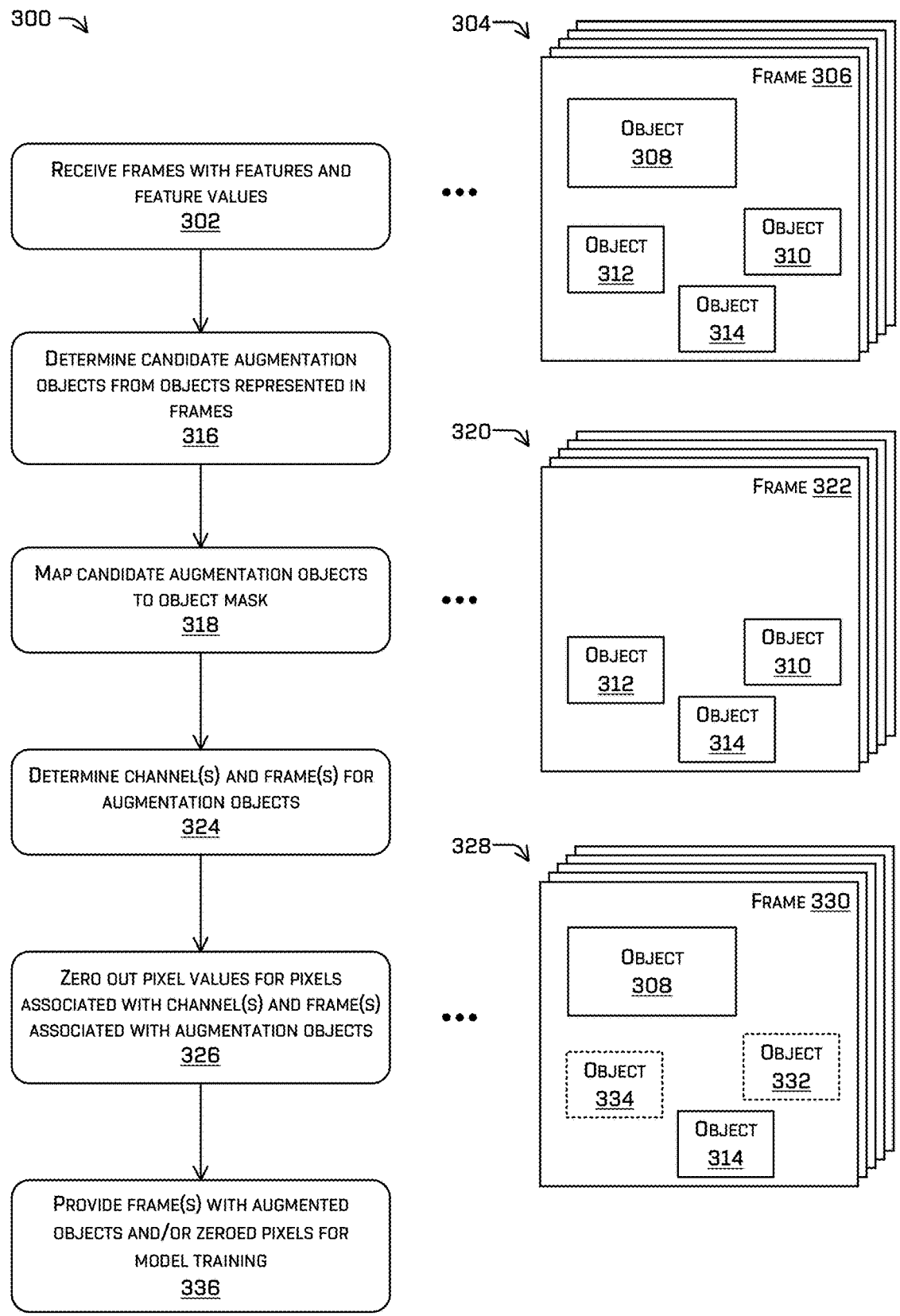
FIG. 3 is a pictorial flow diagram of another example process for performing data augmentation and determining training data for training a machine-learned model, in accordance with examples of the disclosure.

FIG. 3 is a pictorial flow diagram of an example process 300 for training a machine-learned model to improve object detections performed at a vehicle that may be operating in an environment by locally augmenting frames and using these augmented frames to train the model. In some examples, one or more operations of the process 300 may be implemented by a vehicle computing system and/or by a machine-learned model training system, such as by using one or more of the components and systems illustrated in FIGS. 5 and 8 and described below. For example, one or more components and systems can include those associated with one or more of the one or more sensor systems 806, the perception component 822, and/or the planning component 828 of FIG. 8. In some examples, the one or more operations of the process 300 may also, or instead, be performed by system 504 of FIG. 5 and/or one or more components associated therewith. In some examples, the one or more operations of the process 300 may also, or instead, be performed by a remote system in communication with a vehicle, such as the perception component 844 and/or planning component 850 of the computing device(s) 838 illustrated in FIG. 8. Such processes may also, in turn, be performed by the device itself (e.g., using onboard electronics) such that a standalone device may produce such signals without the need for additional computational resources. In still other examples, the one or more operations of the process 300 may be performed by a combination of a remote system and a vehicle computing systems. However, the process 300 is not limited to being performed by such components and systems, and the components and systems of FIGS. 5 and 8 are not limited to performing the process 300.

At operation 302, one or more frames may be received that include one or more features and/or data associated with such features. Such features may include or represent one or more objects, while such feature data may include object data associated with such one or more objects (e.g., geometric and/or non-geometric data). However, features are not limited to objects and objects are not required to be among such features in the disclosed examples. The frames received at operation 302 may represent two-dimensional top-down views of an environment associated with a vehicle. In some examples, the frames received at operation 302 may be included in a training dataset as described herein. Alternatively or additionally, the received frames may be determined based on a dataset that, for example, includes one or more multichannel data structures representing sensor data and/or other types of data included in a training dataset. For example, a training dataset including such frames may be received at a machine-learned model training and/or execution system (e.g., a vehicle computing system). In particular examples, the received frames and associated data may include data corresponding to multiple sensor types, such as vision, sonar, radar, lidar, etc.

Example frames 304 may be a set of frames, individual frames of which represent a top-down view of a portion of an environment that may be represented in a dataset. Individual frames of the set of example frames 304 may correspond to sensor data captured at a particular (e.g., different) times in the environment. As shown in frame 306 of the example frames 304, objects 308, 310, 312, and 314 may represent objects detected in the environment. These objects may have associated object data, such as channel data, classification data, geometric data, and/or kinematic data.

At operation 316, the system may determine candidate augmentation objects from among the objects that may be represented in the frames received at operation 302. In various examples, the system may determine one or more less common or relatively rare objects as candidate objects for augmentation. In some examples, the system may also, or instead, randomly select a number of objects represented in the frames or a percentage of objects represented in the frames as candidate objects for augmentation. In some examples, one or more criteria may be used to determine this percentage or number used for such random selection. In other examples, the system may determine one or more objects as candidate objects for augmentation based on one or more criteria, such as object type (e.g., object classification or label), object property, object data (e.g., geometric data, kinematic data, etc.), channel or sensor data, etc.

At operation 318, the system may map the determined candidate augmentation objects to a two-dimensional top-down object mask for potential selection as augmentations objects, removing the remaining non-candidate objects from use in subsequent augmentation determinations.

Example frames 320 may be a set of frames, individual frames of which may correspond to frames of the set of frames 304 that contain determined candidate augmentation objects and to which have been applied an object mask. For example, as shown in frame 322 of the example frames 320, objects 310, 312, and 314 may represent determined candidate augmentation objects determined from the frame 306. The object 308 may have been masked out of frame 306 to determine example frame 322. The frame 322 may include and/or be associated with object data associated with the objects 310, 312, and 314, such as channel data, classification data, geometric data, and/or kinematic data.

At operation 324, the system may determine one or more channels associated with the candidate augmentation objects and one or more frames associated with the augmentation objects. In various examples, the system may determine a random number or percentage of channels associated with the candidate augmentation objects. Similarly, the system may determine a random number or percentage of frames associated with the candidate augmentation objects. In other examples, one or more criteria may be used to determine the percentage or number used for this random selection of channels and/or frames. In other examples, the system may determine one or more channels and/or one or more frames associated with candidate augmentation objects based on one or more criteria, such as one or more particular channel types (e.g., lidar, vision, radar, etc.), one or more channel properties (e.g., noise, density, intensity, etc.) and/or one or more particular frame attributes or characteristics.

At operation 326, the system may modify the pixel values associated with the candidate augmentation objects that are also associated with the determined channels and frames. For example, the system may determine, from among the candidate augmentation objects, which of those objects are represented in data associated with the (e.g., randomly) selected channel(s) and/or sensor data associated with the selected channel(s). The system may also, or instead, determine, from among the candidate augmentation objects, which of those objects are also represented in the (e.g., randomly) selected frames. For those objects associated with both the selected channel(s) and the selected frame(s), the system may zero out (or otherwise set to zero or null) the values for any pixels associated with that object in the selected frames. In this way, these augmentation objects, determined from the candidate augmentation objects as described, may be essentially removed from these frames and therefore dropped from the training data, allowing the remaining data to be more impactful in trained the machine-learned model.

Example frames 328 may be a set of augmented frames, individual frames of which may correspond to frames of the sets of frames 304 and 320 and that may include augmented objects for which pixel value adjustments have been implemented. For example, as shown in frame 330 of the example frames 328, objects 334 and 332 may represent augmented objects 310 and 312, respectively, that have had their associated pixel values set to zero. The object 308 may remain in its original form in frame 330 as it was not selected as a candidate augmentation object and therefore remains unchanged in the augmentation frames. The object 314 may remain in frame 330 unchanged because, while it may have been among the candidate augmentation objects, the object 314 was not selected for augmentation and therefore remains unchanged in the augmentation frames. The frame 330 may include and/or be associated with object data associated with the objects 308 and 314, such as channel data, classification data, geometric data, and/or kinematic data. In some examples, data associated with objects 334 and/or 332 may also be removed from the frame 330 while in other examples, data other than the pixel data may be retained in the frame 330.

At operation 336, the locally augmented frames and/or associated data may be provided to a machine-learned model training system for training a model to perform object detection operations. In various examples, the frames, including augmented objects and object data, may be included in a dataset that includes one or more other frames (e.g., globally augmented frames) and/or may be used to generate such a dataset. In other examples, the frames containing augmented objects and object data may be used, for example along with one or more other frames having augmentation data, to generate a multichannel data structure that may be used to train a model.

Figure 4:
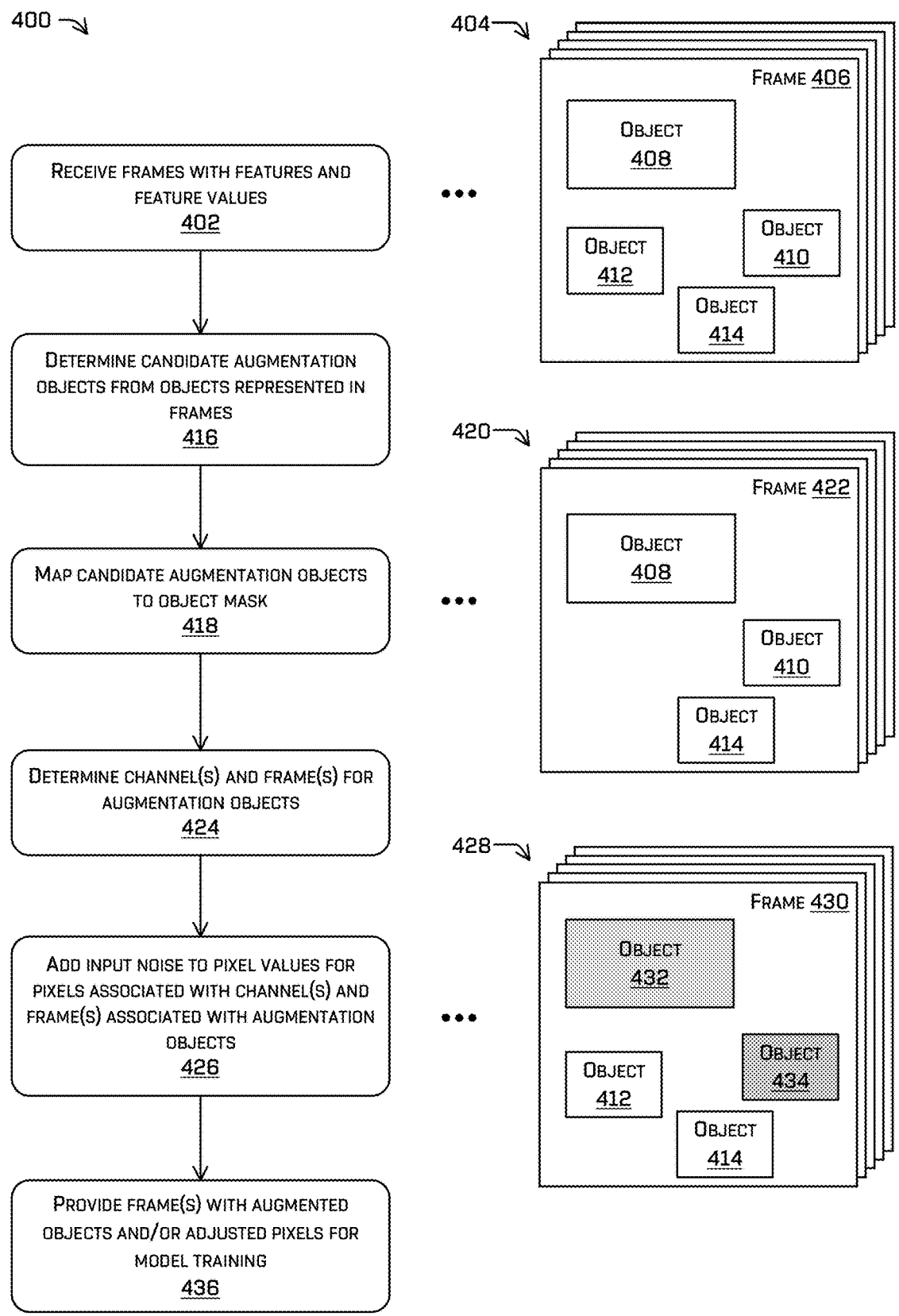
FIG. 4 is a pictorial flow diagram of another example process for performing data augmentation and determining training data for training a machine-learned model, in accordance with examples of the disclosure.

FIG. 4 is a pictorial flow diagram of another example process 400 for training a machine-learned model to improve object detections performed at a vehicle that may be operating in an environment by locally augmenting frames and using these augmented frames to train the model. In some examples, one or more operations of the process 400 may be implemented by a vehicle computing system and/or by a machine-learned model training system, such as by using one or more of the components and systems illustrated in FIGS. 5 and 8 and described below. For example, one or more components and systems can include those associated with one or more of the one or more sensor systems 806, the perception component 822, and/or the planning component 828 of FIG. 8. In some examples, the one or more operations of the process 400 may also, or instead, be performed by system 504 of FIG. 5 and/or one or more components associated therewith. In some examples, the one or more operations of the process 400 may also, or instead, be performed by a remote system in communication with a vehicle, such as the perception component 844 and/or planning component 850 of the computing device(s) 838 illustrated in FIG. 8. Such processes may also, in turn, be performed by the device itself (e.g., using onboard electronics) such that a standalone device may produce such signals without the need for additional computational resources. In still other examples, the one or more operations of the process 400 may be performed by a combination of a remote system and a vehicle computing systems. However, the process 400 is not limited to being performed by such components and systems, and the components and systems of FIGS. 5 and 8 are not limited to performing the process 400.

At operation 402, one or more frames may be received that include one or more features and/or data associated with such features. As noted above, while such features may include or represent one or more objects and such feature data may include object data associated with such one or more objects (e.g., geometric and/or non-geometric data), features are not limited to objects and objects are not required to be among such features. The frames received at operation 402 may represent two-dimensional top-down views of an environment associated with a vehicle and may be included in a training dataset. Alternatively or additionally, the received frames may be determined based on a such dataset as described herein. A training dataset that includes frames such as those received at operation 402 may be received at a machine-learned model training and/or execution system (e.g., a vehicle computing system). In particular examples, the received frames and associated data may include data corresponding to multiple sensor types, such as vision, sonar, radar, lidar, etc.

Similar to the example frames 304 of FIG. 3, example frames 404 may be a set of frames representing top-down views of a portion of an environment. Individual such frames of the set of example frames 404 may correspond to sensor data captured at a particular times in the environment. As shown in frame 406 of the example frames 404, objects 408, 410, 412, and 414 may represent objects detected in the environment. These objects may have associated object data, such as channel data, classification data, geometric data, and/or kinematic data.

At operation 416, the system may determine candidate augmentation objects from among the objects that may be represented in the frames received at operation 402. In various examples, similar to process 300, the system may determine one or more less common or relatively rare objects as candidate objects for potential augmentation. Alternatively or additionally, the system may randomly select a number of objects represented in the frames or a percentage of objects represented in the frames as candidate augmentation objects. In some examples, one or more criteria may be used to determine the percentage or number used for such random selection. In other examples, the system may determine one or more objects as candidate objects for augmentation based on one or more criteria, such as object type (e.g., object classification or label), object property, object data (e.g., geometric data, kinematic data, etc.), channel or sensor data, etc.

At operation 418, the system may map the determined candidate augmentation objects to a two-dimensional top-down object mask for potential selection as augmentations objects, removing the remaining non-candidate objects from use in subsequent augmentation determinations.

Example frames 420 may be a set of frames, individual frames of which may correspond to frames of the set of frames 404 that contain determined candidate augmentation objects and to which have been applied an object mask. For example, as shown in frame 422 of the example frames 420, objects 408, 410, and 414 may represent determined candidate augmentation objects determined from the frame 406. The object 412 may have been masked out of frame 406 to determine example frame 422. The frame 422 may include and/or be associated with object data associated with the objects 408, 410, and 414, such as channel data, classification data, geometric data, and/or kinematic data.

At operation 424, the system may determine one or more channels associated with the candidate augmentation objects and one or more frames associated with the augmentation objects. As with process 300, in various examples of process 400, the system may determine a random number or percentage of channels associated with the candidate augmentation objects. Similarly, the system may determine a random number or percentage of frames associated with the candidate augmentation objects. In other examples, one or more criteria may be used to determine the percentage or number used for this random selection of channels and/or frames. In other examples, the system may determine one or more channels and/or one or more frames associated with candidate augmentation objects based on one or more criteria, such as one or more particular channel types (e.g., lidar, vision, radar, etc.), one or more channel properties (e.g., noise, density, intensity, etc.) and/or one or more particular frame attributes or characteristics.

At operation 426, the system may modify the pixel values associated with the candidate augmentation objects that are also associated with the determined channels and frames. For example, the system may determine, from among the candidate augmentation objects, which of those objects are represented in data associated with the (e.g., randomly) selected channel(s) and/or sensor data associated with the selected channel(s). The system may also, or instead, determine, from among the candidate augmentation objects, which of those objects are also represented in the (e.g., randomly) selected frames. The system may further sample input noise (e.g., based on a Gaussian distribution of input noise that may be, for example, associated with one or more channels). For those objects associated with both the selected channel(s) and the selected frame(s), the system may add a value of, or based on, the sampled input noise to (e.g., any or all) pixels associated with that object in the selected frames. In this way, these augmentation objects, determined from the candidate augmentation objects as described, may be essentially boosted by the noise associated with such objects in these frames and therefore more likely to be used for training purposes when included in training data used to train a machine-learned model.

Example frames 428 may be a set of augmented frames, individual frames of which may correspond to frames of the sets of frames 404 and 420 and that may include augmented objects for which pixel value adjustments have been implemented. For example, as shown in frame 430 of the example frames 428, objects 432 and 434 may represent augmented objects 408 and 410, respectively, that have had their associated pixel values increased based on noise values. The object 412 may remain in frame 430 in its original condition as it was not selected as a candidate augmentation object and therefore remains unchanged in the augmentation frames. The object 414 may remain in frame 430 unchanged because, while it may have been among the candidate augmentation objects, the object 414 was not selected for augmentation and therefore remains unchanged in the augmentation frames. The frame 430 may include and/or be associated with augmented and/or unchanged object data associated with the objects 432 and 434. For example, data other than pixel data for these objects, such as channel data, classification data, geometric data, and/or kinematic data, may have also been augmented based on the process 400 and/or one or more other processes. In some examples, data associated with objects 432 and 434 other than pixel data may be retained in the frame 430 as received in the frames 404 and not altered.

At operation 436, the locally augmented frames and/or associated data may be provided to a machine-learned model training system for training a model to perform object detection operations. In various examples, the frames, including augmented objects and object data, may be included in a dataset that includes one or more other frames (e.g., globally augmented frames and/or other frames with locally augmented objects) and/or may be used to generate such a dataset. In other examples, the frames containing augmented objects and object data may be used, for example along with one or more other frames having augmentation data, to generate a multichannel data structure that may be used to train a model.

As described herein, in various examples, particular object types in a dataset may be determined and augmented instead of, or in addition to, global augmentation and/or local augmentation of randomly determined objects. For example, at operation 416 of process 400, one or more particular objects associated with a particular class of object that may typically be difficult to detect and/or classify properly (e.g., "pedestrian in a wheelchair," "pedestrian with an object," etc.) may be identified in the frames received at operation 402 for augmentation as candidate augmentation objects.

A binary mask may be determined for these objects at operation 418 and applied to set the pixel values associated with such objects to a particular value (e.g., 1) while setting the pixel values associated with other types of objects to another value (e.g., 0). This mask may then be used to augment the loss associated with such objects for machine-learned model training purposes.

For example, the original loss for individual pixels in the training dataset may be multiplied by one plus the value associated with that pixel in the binary mask (e.g., loss=original_loss*(1+binary_mask_value)). In this way, the loss for objects in the determined particular class of objects may be augmented (e.g., doubled, where loss=original_loss*(1+binary_mask_value)=original_loss* (1+1)=original_loss*2), while the loss for other objects may not be affected by the binary mask (e.g., loss=original_loss* (1+binary_mask_value)=original_loss*(1+0)=original_ loss*1). Such loss-adjusted objects may then be provided at operation 436 to a system for training a machine-learned model.

FIG. 5 is a block diagram of an augmented training data determination system 500 according to various examples. The system 500 may be implemented at machine-learned model training system and/or at a vehicle (e.g., an autonomous vehicle) by a vehicle computing system. The system 500 may include one or more of the components and systems illustrated in FIG. 8 and described below. These components may be configured as described herein or in any other configuration and may perform any subset of their associated operations in any or and/or in conjunction with other one or more other operations. For example, one or more components and systems can include and/or be implemented using processors 816 and/or 840 and/or memories 818 and/or 842. In some examples, one or more operations performed by the system 500 may be implemented as a combination of a components at a remote system and a vehicle computing system. However, the system 500 is not limited to being performed by such components and systems, and the components and systems of FIG. 8 are not limited to implementing the system 500.

One or more datasets 502 may be received and/or provided to a training data augmentation system 504. The dataset(s) 502 may be based on multi-modal data and/or may be a multichannel data structure. The dataset(s) 502 may include and/or be used to determine two-dimensional frames based on multi-modal sensor data and/or other data. In various examples, this data may originate at a vehicle, for example, generated by sensors capturing data in an environment as the vehicle travels within the environment. Alternatively, the dataset(s) 502 may be simulated or artificially generated data representing data that may be captured by sensors configured at a vehicle traveling through an environment. In still other examples, the dataset(s) 502 may be the output of a machine-learned model, for example, that is in a training process and/or being trained by a machine-learned model training system as described herein. In various examples, the dataset(s) 502 may be determined based on one or more multichannel data structures representing data associated with various types of sensors, such as image sensors (e.g., cameras), lidar sensors, radar sensors, sonar sensors, etc. that may capture sensor data representing an environment. The dataset(s) 502 may include data associated with objects detected in an environment. The dataset(s) 502 may include one or more significant condition indications.

The training data augmentation system 504 may include a significant data determination component 506 that may detect or otherwise determine portions (e.g., frames, images, representations, channel portions, etc.) of the dataset(s) 502 that may be associated with an indication of a significant condition as described herein and/or may otherwise represent a significant condition. The significant data determination component 506 may determine the properties of such portions of the dataset(s) 502 and use these properties to determine one or more portions of the dataset(s) to provide to the augmentation components 508 and/or 514 for augmentation. For example, the significant data determination component 506 may determine portions of the same dataset of dataset(s) 502 in which it has detected significant condition indications that have such properties. Alternatively or additionally, the significant data determination component 506 may use these properties to determine portions of a different dataset of the dataset(s) 502 to provide to the augmentation components.

In some examples, the significant data determination component 506 may provide portions of the dataset(s) 502 that are associated with properties of the portions of a dataset associated with significant conditions to one or more augmentation components and may not provide the remaining portions of such datasets to such components. In such examples, the training data augmentation system 504 may aggregate or otherwise combine the augmented portions of a dataset with the remaining portions of the dataset to determine the augmented dataset 522.

Alternatively, the significant data determination component 506 may provide both the portions of a dataset associated with significant conditions and the remaining portions of such a dataset to one or more augmentation components, along with one or more indicators or other data that may be used by such augmentation components to determine which portions of the received dataset to augment. In some examples, the augmentation components may perform the significant condition indication property determinations to determine the portions of a dataset to augment. In such examples, the resulting augmented dataset 522 determined by the augmentation components may include both those portions of such a dataset that have been augmented and those that have not. In other examples, the significant data determination component 506 may be omitted and one or both of the augmentation components 508 and 514 may augment portions of the dataset based on other criteria.

The training data augmentation system 504 may include the global augmentation component 508 that may include a geometric value augmentation component 510 and a non-geometric value augmentation component 512. The global augmentation component 508 may perform global augmentation operations on entire frames or other portions of a dataset. For example, the geometric value augmentation component 510 may adjust the physical values and/or geometrical properties associated with objects and features in a frame so that they are flipped about an axis in the frame and/or adjusted in some other manner (e.g., translated, rotated, etc.). The non-geometric value augmentation component 512 may adjust other values and/or properties associated with objects and features represented in the frame based on the physical and/or geometric changes made (e.g., flipping, translation, rotation, etc.).

In various examples, globally augmented frames may also be locally augmented as described herein. In such examples, the global augmentation component 508 may provide globally augmented frames to a local augmentation component 514 for further augmentation. Note that in other examples, local augmentation may be performed (e.g., based on dataset 502) without performing global augmentation and vice versa.

The local augmentation component 514 may be configured with an augmentation object determination and masking component 516 and an augmentation object channel and frame determination component 518, as well as a pixel adjustment component 520. The augmentation object determination and masking component 516 may determine one or more objects in individual frames of the dataset 502 or the augmented frames provided by the global augmentation component 508. The component 516 may perform this operation by randomly selecting a percentage or a number of objects represented in such frames as candidate augmentation objects. The component 516 may then map the objects to a two-dimensional top-down object mask to isolate the candidate augmentation objects for use in the selection of augmentation objects.

The augmentation object channel and frame determination component 518 may determine a random number or percentage of channels from among those associated with the candidate augmentation objects and a random number or percentage of frames from among those associated with the candidate augmentation objects. In other examples, other criteria may be used to determine channels and/or frames. The pixel adjustment component may adjust the pixel values for object in the randomly determined frames that are associated with the randomly determined channels. As described herein, this adjustment may include zeroing out the pixel values, adding noise to pixel values, and/or weighting the loss associated with particular pixels.

In various examples, the training data augmentation system 504 may perform any one or more of the described global augmentations techniques and local augmentation techniques. The resulting augmented pixels and/or frames may then be used to determine or otherwise generate augmented dataset 522 that may be provided to an object detection model training system 524 for use in training an object detection model. In some examples, the resulting augmented dataset 522 may be processed again by the training data augmentation system 504 for additional and/or adjusted augmentation.

In some examples, rather than two-dimensional object data (e.g., frames), three-dimensional object data may be used and/or augmented (e.g., voxels may be adjusted) to generate augmented objects and/or data that may be used as training data, as described herein. Any of the exemplary frame or two-dimensional augmentation techniques used herein may similarly be used with three-dimensional data and multichannel data of any type.

Figure 6:
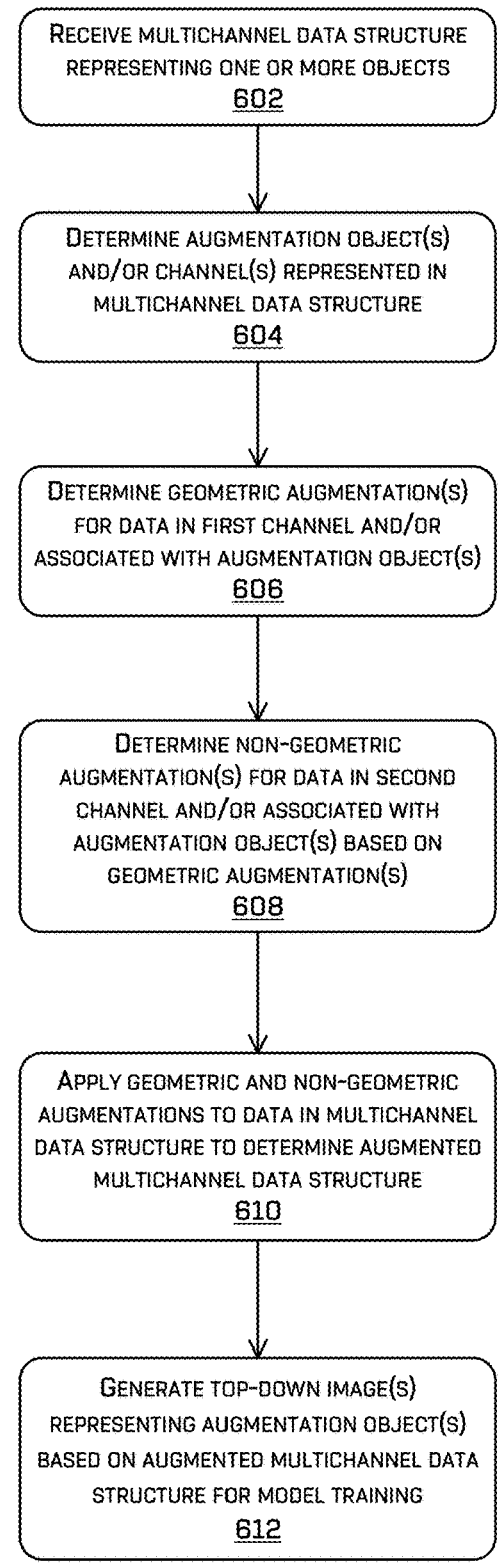
FIG. 6 is a flow diagram of another example process for performing data augmentation and determining training data for training a machine-learned model, in accordance with examples of the disclosure.

For example, FIG. 6 is a flow diagram of a process 600 for training a machine-learned model to improve object detections performed at a vehicle that may be operating in an environment by augmenting multichannel data representing data collected from an environment to generate training data that may be used to train the model. In some examples, one or more operations of the process 600 may be implemented by a vehicle computing system and/or by a machine-learned model training system, such as by using one or more of the components and systems illustrated in FIGS. 5 and 8 and described below. For example, one or more components and systems can include those associated with one or more of the one or more sensor systems 806, the perception component 822, and/or the planning component 828 of FIG. 8. In some examples, the one or more operations of the process 600 may also, or instead, be performed by system 504 of FIG. 5 and/or one or more components associated therewith. In some examples, the one or more operations of the process 600 may also, or instead, be performed by a remote system in communication with a vehicle, such as the perception component 844 and/or planning component 850 of the computing device(s) 838 illustrated in FIG. 8. Such processes may also, in turn, be performed by the device itself (e.g., using onboard electronics) such that a standalone device may produce such signals without the need for additional computational resources. In still other examples, the one or more operations of the process 600 may be performed by a combination of a remote system and a vehicle computing systems. However, the process 600 is not limited to being performed by such components and systems, and the components and systems of FIGS. 5 and 8 are not limited to performing the process 600.

At operation 602, a multichannel data structure may be received that includes data representing features and aspects that may have been detected or otherwise determined from an environment. Such features and aspects may include or represent one or more objects. The multichannel data structure may further include data associated with such one or more objects. However, features are not limited to objects and objects are not required to be among such features. Individual channels in the multichannel data structure received at operation 602 may represent geometric and/or non-geometric data associated with an environment and/or one or more objects therein. For example, a channel may represent data associated with a particular sensor system or type of sensor (e.g., lidar, radar, vision, sonar, time-of-flight, etc.), At operation 604, the system may determine candidate augmentation objects from among the objects that may be represented in the multichannel data structure received at 602. In various examples, the system may determine one or more less common or relatively rare objects as candidate objects for augmentation. For example, the multichannel data structure received at 602 may include indications or object and/or one or more labels associated with such objects. The system may determine one or more labels that indicate less common and/or rare objects and select one or more objects for augmentation that may be associated with such labels in the multichannel data structure. In examples, the system may also, or instead, randomly select one or more objects represented in the multichannel data structure or a percentage of objects represented in the multichannel data structure as candidate objects for augmentation. In some examples, one or more criteria may be used to determine this percentage or number used for such random selection. In other examples, the system may determine one or more objects as candidate objects for augmentation based on criteria, such as object type (e.g., object classification or label), object property, object data (e.g., geometric data, kinematic data, etc.), channel or sensor data, etc.

Alternatively or additionally, at operation 604 the system may determine one or more channels for augmentation from among the channels included in the multichannel data structure received at 602. For example, the system may determine one or more channels associated with determined augmentation objects. Alternatively or additionally, the system may determine one or more channels randomly or based on any one or more criteria. For example, the system may determine a first one or more channels for geometric augmentation and a second, different one or more channels for non-geometric augmentation. This determination may be based on the types of data available in such channels. For instance, a first particular channel may represent data that is associated with geometric properties (location data, dimension data, etc.) while a second particular channel may represent data that is associated with non-geometric properties (e.g., kinematic values, intensity values, color values, etc.). In this example, the system may select the first particular channel for geometric augmentations and the second particular channel for non-geometric augmentations.

In examples, at operation 604 the system may determine a random number or percentage of channels (e.g., generally or associated with the candidate augmentation objects). In some examples, one or more criteria may be used to determine the percentage or number used for this random selection of channels. In other examples, the system may determine one or more channels (e.g., generally or associated with candidate augmentation objects) based on one or more criteria, such as one or more particular channel types (e.g., lidar, vision, radar, etc.), one or more channel properties (e.g., noise, density, intensity, etc.) and/or one or more particular frame attributes or characteristics, (geometric or non-geometric properties of the data represented in the channel), etc.

In various examples, the operations of 604 may including determining one or both candidate augmentation objects and candidate augmentation channels. For example, one or more channels may be selected for use in the disclosed augmentation operations without determining any one or more particular augmentation objects (e.g., all data included within the determined one or more channels may be augmented). Alternatively, one or more candidate augmentation objects may be determined within one or more determined candidate augmentation channels.

At operation 606, the system may augment the geometric features of data within one or more determined channels. For example, the system may modify the coordinates, dimensions, location data, position data (center, yaw, coordinates, etc.), and any other physical location and/or geometric aspects of particular features represented in a one or more channels to determine an augmented channel (e.g., as described herein in regard to geometrically augmented frames). For example, augmentations may be performed with respect to a particular point or axis of two-dimensional and/or three-dimensional space represented by the multi-channel data structure. Such augmentations may be performed on (e.g., all) data associated with one or more channels determined for geometric augmentation at operation 604 and/or on (e.g., only) data associated with one or more particular objects determined for geometric augmentation (e.g., at 604). The augmentations performed at operation 606 may be any modification of one or more values represented in one or more channels of the multichannel data structure received at operation 602, including any of the modifications described herein.

At operation 608, the system may augment non-geometric features of data within one or more determined channels. Such non-geometric augmentations may be based on the geometric augmentations performed at operation 606. For example, the system may modify the kinematic features of an augmentation object represented in a channel determined for non-geometric augmentations based on the geometric augmentations determined for that object in a different channel of the multichannel data structure. Alternatively or additionally, the system may modify (e.g., all) the non-geometric data in a channel determined for non-geometric augmentations based on the geometric augmentations determined for a different channel of the multichannel data structure. The augmentations performed at operation 608 may be any modification of one or more values represented in one or more channels of the multichannel data structure received at operation 602, including any of the modifications described herein.

In various examples, non-geometric augmentations for channels in a multichannel data structure may be performed based on the geometric augmentations for particular augmentation objects, or vice versa. For example, one or more global geometric augmentations may be determined for a first one or more channels in the multichannel data structure. One or more local (e.g., object-specific) non-geometric augmentations may then be determined for data associated with one or more objects represented in a second one or more channels in the multichannel data structure. Similarly, one or more global non-geometric augmentations may be determined for a first one or more channels in the multichannel data structure and used to determine geometric augmentations for data associated with one or more objects represented in a second one or more channels in the multichannel data structure. In other examples, one or more local (e.g., object-specific) geometric augmentations may be determined for data associated with one or more objects represented in a first one or more channels in the multichannel data structure and used to determine one or more global non-geometric augmentations for data in a second one or more channels of the multichannel data structure, and vice versa. In any of these examples, the first one or more channels may or may not be distinct from the second one or more channels.

In various examples, non-geometric augmentations for a particular channel and/or one or more objects represented in that channel may be determined based on sampled data from other channels, such as data sampled from a Gaussian distribution of noise represented in another channel. Such sampled data may be modified based on one or more geometric augmentations. In various embodiments, geometric augmentation data may be used in combination with one or more algorithms or operations to determine non-geometric data.

At operation 610, the augmentations determined at operations 606 and/or 608 may be used to determine an augmented multichannel data structure. For example, the geometric and non-geometric augmentations determined at these operations may be used to determine an augmented data structure that includes channels representing such augmentations and, if applicable, any other channels of the multichannel data structure received at operation 602 that may remain augmented.

At operation 612, the augmented multichannel data structure may be used to determine an image that may be used to train a machine-learned model. For example, the augmented multichannel data structure may be used to determine an augmented top-down image representing the environment associated with the multichannel data structure received at operation 602. This image may be provided to a machine-learned model training system for training a model to perform object detection operations. In various examples, the determined image may be included in a dataset that includes one or more other images (e.g., similarly augmented images and/or images based on similarly augmented multichannel data structures) and/or may be used to generate such a dataset. In other examples, the image determined at 612 may be used, for example along with one or more other images, to generate one or more multichannel data structures that may be used to train a model.

In various examples, the image determined at operation 612 may also, or instead, be used to determine further augmented data. For example, the image determined at 612 may be used, for example along with one or more other images, to generate one or more multichannel data structures that may then be processed using the operations of process 600, for example, as a multichannel data structure received as input at operation 612.

Figure 7:
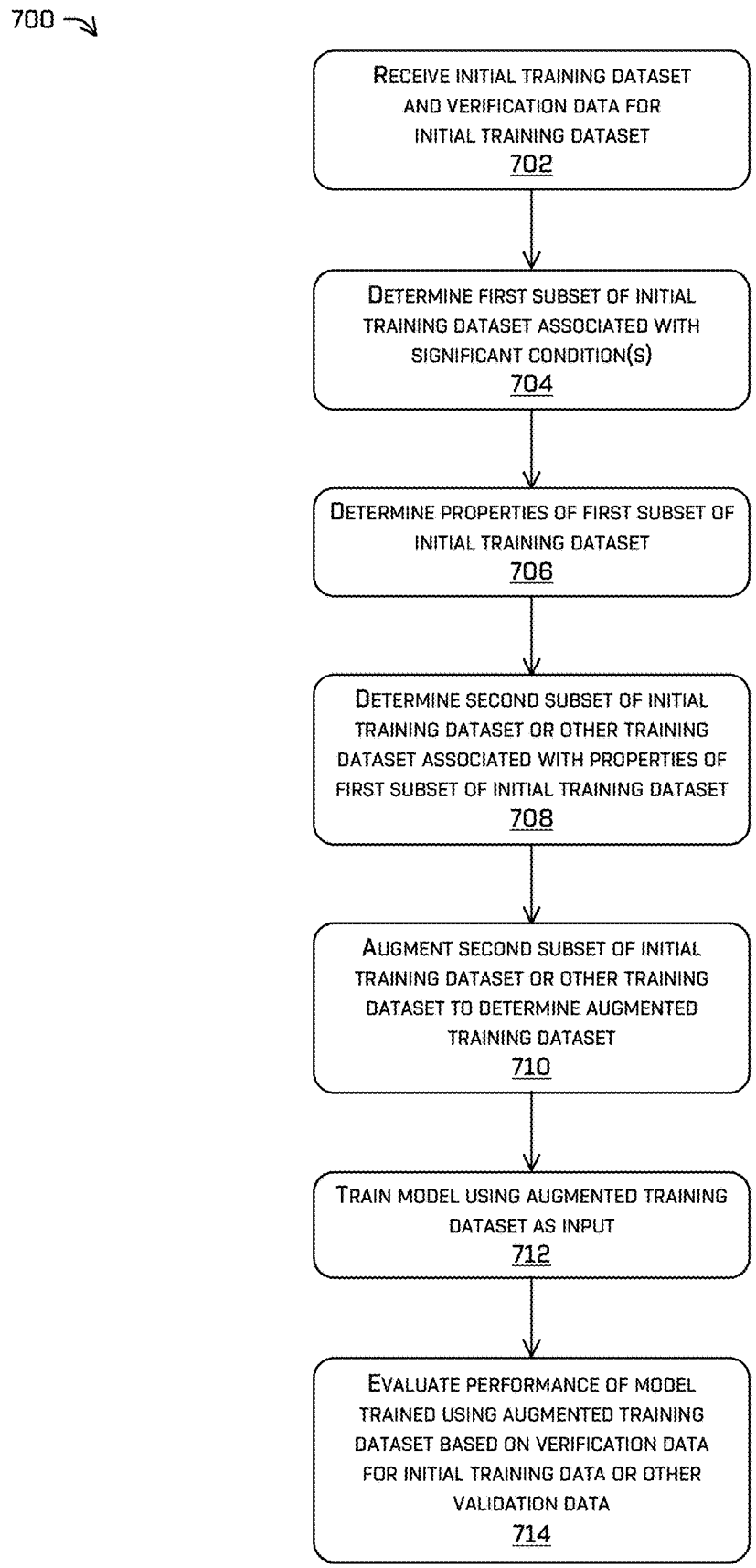
FIG. 7 is a flow diagram of an example process for determining data for data augmentation as training data for training a machine-learned model, in accordance with examples of the disclosure.

FIG. 7 is a flow diagram of a process 700 for determining and evaluating augmented training data that may be used to train a machine-learned model to improve object detections, for example, performed at a vehicle operating in an environment. In some examples, one or more operations of the process 700 may be implemented by a vehicle computing system and/or by a machine-learned model training system, such as by using one or more of the components and systems illustrated in FIGS. 5 and 8 and described below. For example, one or more components and systems can include those associated with one or more of the one or more sensor systems 806, the perception component 822, and/or the planning component 828 of FIG. 8. In some examples, the one or more operations of the process 700 may also, or instead, be performed by the training data augmentation system 504 of FIG. 5 and/or one or more components associated therewith. In some examples, the one or more operations of the process 700 may also, or instead, be performed by a remote system in communication with a vehicle, such as the perception component 844 and/or planning component 850 of the computing device(s) 838 illustrated in FIG. 8. Such processes may also, in turn, be performed by the device itself (e.g., using onboard electronics) such that a standalone device may produce such signals without the need for additional computational resources. In still other examples, the one or more operations of the process 700 may be performed by a combination of a remote system and a vehicle computing systems. However, the process 700 is not limited to being performed by such components and systems, and the components and systems of FIGS. 5 and 8 are not limited to performing the process 700.

At operation 702, an initial dataset may be received. This initial dataset may be a training dataset and may be received along with verification data, such as safety metrics associated with the execution of a machine-learned model trained using this initial dataset. Alternatively or additionally, the initial dataset received at operation 702 may be data associated with a vehicle traversing an environment, such as real-world data collected and/or generated by such a vehicle or data simulating such real-world data. This dataset may include one or more multichannel data structures and/or other data structures that may include any one or more types of data, such as those described herein.

At operation 704, one or more indications of one or more significant conditions may be determined in the dataset received at operation 702. As described herein, such indications may be associated with notifying a remote operator, obstacle intersections, and/or any other unusual or uncommon situations. Further at operation 704, the portions of the dataset received at 702 that are associated with the indication may be determined. For example, the system may determine particular data structures that store or represent the indication. For instance, if an indication is stored or represented in a frame, the system may identify those frames representing the indication. Alternatively or additionally, the system may identify other data structures that are associated with the indication. For example, if an indication is represented in particular temporal portion of a particular channel in a multichannel data structure, the system may determine corresponding temporal portions of other channels included in the multichannel data structure (e.g., that are associated with a same or similar time as the indication).

At operation 706, the system may determine one or more properties of the subset of the portions of the dataset determine at 704. For example, the system may determine one or more object types, object and/or vehicle (e.g., relative) positions, vehicle operating conditions (e.g., acceleration, velocity, etc.), environmental conditions (e.g., road surface type, weather, lighting, etc.), and/or any other properties that may be represented in a dataset or portion of a dataset (e.g., frame, channel, data structure, any subset thereof, etc.).

At operation 708, the system may determine one or more other portions of a dataset that are associated with the properties determined at operation 706. In examples, the system may determine other portions of the same dataset received at operation 702 that may be associated with such properties (e.g., portions that may or may not be associated with the indication(s) determined at 704). Alternatively or additionally, the system may determine portions of one or more other dataset that may be associated with such properties. As described herein, such portions may be frames, portions of channels, portions of data structures, etc.

In various examples, the system may determine portions of a dataset that share all or a subset of such properties or are otherwise associated with substantially similar properties. For example, where a determined property is a vehicle velocity of 35 miles per hour (MPH), the system may determine that portions of a dataset that include vehicle velocities of between 30 and 40 MPH are associated with that property. Alternatively or additionally, where determined properties include three particular types of object proximate to the vehicle, the system may determine that portions of a dataset that include at least two of the three types of objects similarly proximate to a vehicle are associated with those properties. Any combination and/or threshold quantity of properties of a portion of a dataset may be used to determine corresponding portions of one or more (e.g., other or same) datasets.

At 710, the system may augment the portions of the dataset determined at operation 708. For example, the system may perform global augmentation of such portions as described herein and/or local augmentation (e.g., of one or more objects) as described herein, for instance, based on one or more pf the properties determined at 706 and/or used at 708. Such augmentations may further be geometric and/or non-geometric as described herein. Further at 710, the system may determine an augmented training dataset based on such augmentations, for example, combining the remaining unaugmented portions of the dataset with the augmented portions of the dataset or otherwise aggregating the augmented portions of the dataset with other data to determine the augmented dataset. At operation 712, a machine-learned model may be trained using the augmented dataset.

At operation 714, the performance of the model trained using the augmented dataset may be evaluated, for example, to determine the effectiveness of the augmented dataset as training data for a machine-learned model. In various examples, the machine-learned model trained using the augmented dataset may be executed using a set of parameterized scenarios to generate results. The system may use these results to determine one or more metrics that may be used to assess the effectiveness of the model as trained. For example, based on such results, the system may determine one or more safety metrics, such as accurate driving risk assessments, avoidances of potential collisions, detections of hazards, etc. The system may also, or instead, determine one or more other metrics, such as successful detections of one or more object and/or types of objects, successful classification and/or labeling of one or more objects, timing and/or efficiency of model execution, timing and/or efficiency of the performance of particular operations by the model, and/or any other type of metric.

To determine the effectiveness of the model trained using the augmented dataset, the metrics determined based on an execution of such a model may be compared to one or more threshold metrics. If a metric resulting from the execution of the model meets or exceeds a particular threshold metric, the augmented dataset may be determined to be validated for that particular metric. If not, the augmented dataset may be determined to not be validated for that particular metric. In some examples, multiple metrics may be determined and if a sufficient number of such metrics (e.g., all, 75%, 90%, etc.) are validated, the augmented dataset may be determined to be a valid training dataset.

Alternatively or additionally, the machine-learned model may be evaluated against other training datasets and the system may determine whether the augmented dataset is an improvement over such other training datasets. For example, metrics determined based on execution results generated by a model trained using the augmented dataset may be compared to metrics determined based on execution results generated by the model trained using another dataset. If the results of the model trained using the augmented dataset are better than the results of the model trained using the other dataset, the augmentations may be determined to be an improvement and may be implemented in other training datasets. If not, the system may adjust or such remove augmentations in generating future training datasets. Various particular techniques of validating augmented datasets may be used, including various exhaustive and/or non-exhaustive (e.g., k-fold) cross-validation techniques.

FIG. 8 depicts a block diagram of an example system 800 for implementing the techniques described herein. In at least one example, the system 800 can include a vehicle 802. The vehicle 802 can include a vehicle computing device 804 that may function as and/or perform the functions of a vehicle controller for the vehicle 802. The vehicle 802 can also include one or more sensor systems 806, one or more emitters 808, one or more communication connections 810, at least one direct connection 812, and one or more drive systems 814.

The vehicle computing device 804 can include one or more processors 816 and memory 818 communicatively coupled with the one or more processors 816. In the illustrated example, the vehicle 802 is an autonomous vehicle; however, the vehicle 802 could be any other type of vehicle. In the illustrated example, the memory 818 of the vehicle computing device 804 stores a localization component 820, a perception component 822, an object detection component 824, a planning component 828, one or more system controllers 830, one or more maps 832, and a prediction component 834. Though depicted in FIG. 8 as residing in memory 818 for illustrative purposes, it is contemplated that any one or more of the localization component 820, the perception component 822, the object detection component 824, the planning component 828, the one or more system controllers 830, the one or more maps 832, and the prediction component 834 can additionally or alternatively be accessible to the vehicle 802 (e.g., stored remotely).

In at least one example, the localization component 820 can include functionality to receive data from the sensor system(s) 806 to determine a position and/or orientation of the vehicle 802 (e.g., one or more of an x-, y-, z-position, roll, pitch, or yaw). For example, the localization component 820 can include and/or request/receive a map of an environment and can continuously determine a location and/or orientation of the autonomous vehicle within the map. In some instances, the localization component 820 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 820 can provide data to various components of the vehicle 802 to determine an initial position of an autonomous vehicle for generating a trajectory and/or for generating map data, as discussed herein.

In some instances, the perception component 822 can include functionality to perform object detection, segmentation, and/or classification, in addition to, or instead of, object auto-labeling and machine-learned model training operations. For example, the perception component 822 may include the object detection component 824 that may be trained according to the examples provided herein to provide improved object detection. In some examples, the perception component 822 can provide processed sensor data that indicates a presence of an entity that is proximate to the vehicle 802 and/or a classification of the entity as an entity type (e.g., car, pedestrian, cyclist, animal, building, tree, road surface, curb, sidewalk, traffic signal, traffic light, car light, brake light, solid object, impeding object, non-impeding object, unknown). In additional or alternative examples, the perception component 822 can provide processed sensor data that indicates one or more characteristics associated with a detected entity (e.g., a tracked object) and/or the environment in which the entity is positioned. The perception component 822 may use the multichannel data structures to represent processed sensor data. In some examples, characteristics associated with an entity or object can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), a non-impeding or impeding object designation, intensity, etc. Such entity characteristics may be represented in a data structure (e.g., a voxel data structure generated as output of one or more voxelization operations, a two-dimensional grid of cells containing data, etc.). Characteristics associated with the environment can include, but are not limited to, a presence of another entity in the environment, a state of another entity in the environment, a time of day, a day of a week, a season, a weather condition, an indication of darkness/light, etc.

In general, the planning component 828 can determine a path for the vehicle 802 to follow to traverse through an environment. In some examples, the planning component 828 can determine various routes and trajectories and various levels of detail. For example, the planning component 828 can determine a route (e.g., planned route) to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 828 can generate an instruction for guiding the autonomous vehicle along at least a portion of the route from the first location to the second location. In at least one example, the planning component 828 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 802 to navigate.

In at least one example, the vehicle computing device 804 can include one or more system controllers 830, which can be configured to control steering, propulsion, braking, safety, emitters, communication, and other systems of the vehicle 802. These system controller(s) 830 can communicate with and/or control corresponding systems of the drive system(s) 814 and/or other components of the vehicle 802.

The memory 818 can further include one or more maps 832 that can be used by the vehicle 802 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), non-visible light information (near-infrared light information, infrared light information, and the like), intensity information (e.g., lidar information, radar information, near-infrared light intensity information, infrared light intensity information, and the like); spatial information (e.g., image data projected onto a mesh, individual "surfels" (e.g., polygons associated with individual color and/or intensity)); and reflectivity information (e.g., specularity information, retroreflectivity information, BRDF information, BSSRDF information, and the like). In an example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 832 can include at least one map (e.g., images and/or a mesh). In some examples, the vehicle 802 can be controlled based at least in part on the maps 832. That is, the maps 832 can be used in connection with the localization component 820, the perception component 822, and/or the planning component 828 to determine a location of the vehicle 802, identify objects in an environment, and/or generate routes and/or trajectories to navigate within an environment.

In some examples, the one or more maps 832 can be stored on a remote computing device(s) (such as the computing device(s) 838) accessible via network(s) 836. In some examples, multiple maps 832 can be stored based on, for example, a characteristic (e.g., type of entity, time of day, day of week, season of the year). Storing multiple maps 832 can have similar memory requirements but increase the speed at which data in a map can be accessed.

In general, the prediction component 834 can generate predicted trajectories of objects in an environment. For example, the prediction component 834 can generate one or more predicted trajectories for vehicles, pedestrians, animals, and the like within a threshold distance from the vehicle 802. In some instances, the prediction component 834 can measure a trace of an object and generate a trajectory for the object based on observed and predicted behavior. In some examples, the prediction component 834 can use data and/or data structures based on return pulses to generate one or more predicted trajectories for various mobile objects in an environment. In some examples, the prediction component 834 may be a sub-component of perception component 822.

In some instances, aspects of some or all of the components discussed herein can include any models, algorithms, and/or machine learning algorithms. For example, in some instances, the components in the memory 818 (and the memory 842, discussed below) can be implemented as a neural network. For instance, the memory 818 may include a deep tracking network that may be configured with a convolutional neural network (CNN) that may include one or more convolution/deconvolution layers.

An example neural network is an algorithm that passes input data through a series of connected layers to produce an output. Individual layers in a neural network can also comprise another neural network or can comprise any number of layers, and such individual layers may convolutional, deconvolutional, and/or another type of layer. As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure, for example, to determine a learned upsampling transformation. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Auto-Encoders), Dimensionality Stacked Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, EfficientNet, Xception, Inception, ConvNeXt, and the like. Additionally or alternatively, the machine-learned model discussed herein may include a vision transformer (ViTs).

In at least one example, the sensor system(s) 806 can include radar sensors, ultrasonic transducers, sonar sensors, location sensors (e.g., GPS, compass), inertial sensors (e.g., inertial measurement units (IMUs), accelerometers, magnetometers, gyroscopes), cameras (e.g., RGB, IR, intensity, depth), time of flight sensors, microphones, wheel encoders, environment sensors (e.g., temperature sensors, humidity sensors, light sensors, pressure sensors), etc. The sensor system(s) 806 can include multiple instances of one or more of these or other types of sensors. For instance, the camera sensors can include multiple cameras disposed at various locations about the exterior and/or interior of the vehicle 802. The sensor system(s) 806 can provide input to the vehicle computing device 804. Alternatively or additionally, the sensor system(s) 806 can send sensor data, via the one or more networks 836, to the one or more computing device(s) 838 at a particular frequency, after a lapse of a predetermined period of time, in near real-time, etc.

In some examples, the sensor system(s) 806 can include one or more lidar systems, such as one or more monostatic lidar systems, bistatic lidar systems, rotational lidar systems, solid state lidar systems, and/or flash lidar systems. In some examples, the sensor system(s) 806 may also, or instead, include functionality to analyze pulses and pulse data to determine intensity, drivable road presence, and/or other data.

The vehicle 802 can also include one or more emitters 808 for emitting light (visible and/or non-visible) and/or sound. The emitter(s) 808 in an example include interior audio and visual emitters to communicate with passengers of the vehicle 802. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners), and the like. The emitter(s) 808 in this example may also include exterior emitters. By way of example and not limitation, the exterior emitters in this example include lights to signal a direction of travel or other indicator of vehicle action (e.g., indicator lights, signs, light arrays), and one or more audio emitters (e.g., speakers, speaker arrays, horns) to audibly communicate with pedestrians or other nearby vehicles, one or more of which comprising acoustic beam steering technology. The exterior emitters in this example may also, or instead, include non-visible light emitters such as infrared emitters, near-infrared emitters, and/or lidar emitters.

The vehicle 802 can also include one or more communication connection(s) 810 that enable communication between the vehicle 802 and one or more other local and/or remote computing device(s). For instance, the communication connection(s) 810 can facilitate communication with other local computing device(s) on the vehicle 802 and/or the drive system(s) 814. Also, the communication connection(s) 810 can allow the vehicle to communicate with other nearby computing device(s) (e.g., other nearby vehicles, traffic signals). The communications connection(s) 810 also enable the vehicle 802 to communicate with a remote teleoperations computing device or other remote services.

The communications connection(s) 810 can include physical and/or logical interfaces for connecting the vehicle computing device 804 to another computing device or a network, such as network(s) 836. For example, the communications connection(s) 810 can enable Wi-Fi-based communication such as via frequencies defined by the IEEE 802.11 standards, short range wireless frequencies such as Bluetooth, cellular communication (e.g., 2G, 3G, 4G, 4G LTE, 5G) or any suitable wired or wireless communications protocol that enables the respective computing device to interface with the other computing device(s).

In at least one example, the vehicle 802 can include one or more drive systems 814. In some examples, the vehicle 802 can have a single drive system 814. In at least one example, if the vehicle 802 has multiple drive systems 814, individual drive systems 814 can be positioned on opposite ends of the vehicle 802 (e.g., the front and the rear). In at least one example, the drive system(s) 814 can include one or more sensor systems to detect conditions of the drive system(s) 814 and/or the surroundings of the vehicle 802. By way of example and not limitation, the sensor system(s) 806 can include one or more wheel encoders (e.g., rotary encoders) to sense rotation of the wheels of the drive systems, inertial sensors (e.g., inertial measurement units, accelerometers, gyroscopes, magnetometers) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 814. In some cases, the sensor system(s) on the drive system(s) 814 can overlap or supplement corresponding systems of the vehicle 802 (e.g., sensor system(s) 806).

The drive system(s) 814 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port). Additionally, the drive system(s) 814 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 814. Furthermore, the drive system(s) 814 may also include one or more communication connection(s) that enable communication by the respective drive system with one or more other local or remote computing device(s).

In at least one example, the direct connection 812 can provide a physical interface to couple the one or more drive system(s) 814 with the body of the vehicle 802. For example, the direct connection 812 can allow the transfer of energy, fluids, air, data, etc. between the drive system(s) 814 and the vehicle 802. In some instances, the direct connection 812 can further releasably secure the drive system(s) 814 to the body of the vehicle 802.

In some examples, the vehicle 802 can send sensor data to one or more computing device(s) 838 via the network(s) 836. In some examples, the vehicle 802 can send raw sensor data to the computing device(s) 838. In other examples, the vehicle 802 can send processed sensor data and/or representations of sensor data (e.g., data representing return pulses) to the computing device(s) 838. In some examples, the vehicle 802 can send sensor data to the computing device(s) 838 at a particular frequency, after a lapse of a predetermined period of time, in near real-time, etc. In some cases, the vehicle 802 can send sensor data (raw or processed) to the computing device(s) 838 as one or more log files.

The computing device(s) 838 can include processor(s) 840 and a memory 842 storing a planning component 850, a perception component 844, an object detection component 846, and/or a training data augmentation system 852 that may be configured to perform one or more of the operations described herein. In some instances, the perception component 844 can substantially correspond to the perception component 822 and can include substantially similar functionality. In some instances, the object detection component 846 can substantially correspond to the object detection component 824 and can include substantially similar functionality. In some instances, the planning component 850 can substantially correspond to the planning component 828 and can include substantially similar functionality. In some instances, the training data augmentation system 852 may perform one or more of the training data augmentation operations described herein.

The processor(s) 816 of the vehicle 802 and the processor(s) 840 of the computing device(s) 838 can be any suitable one or more processors capable of executing instructions to process data and perform operations as described herein. By way of example and not limitation, the processor(s) 816 and 840 can comprise one or more Central Processing Units (CPUs), Graphics Processing Units (GPUs), and/or any other device or portion of a device that processes electronic data to transform that electronic data into other electronic data that can be stored in registers and/or memory. In some examples, integrated circuits (e.g., ASICs), gate arrays (e.g., FPGAs), and other hardware devices can also be considered processors in so far as they are configured to implement encoded instructions.

Memory 818 and 842 are examples of non-transitory computer-readable media. The memory 818 and 842 can store an operating system and one or more software applications, instructions, programs, and/or data to implement the techniques and operations described herein and the functions attributed to the various disclosed systems. In various implementations, the memory 818 and 842 can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 8 is illustrated as a distributed system, in alternative examples, components of the vehicle 802 can be associated with the computing device(s) 838 and/or components of the computing device(s) 838 can be associated with the vehicle 802. That is, the vehicle 802 can perform one or more of the functions associated with the computing device(s) 838, and vice versa.

Example Clauses

The following paragraphs describe various examples. Any of the examples in this section may be used with any other of the examples in this section and/or any of the other examples or embodiments described herein.

A: A system comprising: one or more processors; and one or more non-transitory computer-readable media storing instructions executable by the one or more processors, wherein the instructions, when executed, cause the system to perform operations comprising: receiving a first dataset comprising a first multichannel data structure representing an environment, the first multichannel data structure comprising a plurality of channels representing detections in the environment and one or more indications of a significant condition represented in the first multichannel data structure; determining a property of a portion of the first multichannel data structure associated with an indication of the significant condition: determining a portion of a second multichannel data structure associated with the property: based at least in part on determining the portion of a second multichannel data structure: determining augmented geometric data using a first augmentation based at least in part on first data associated with the portion of the second multichannel data structure; and determining augmented non-geometric data using a second augmentation based at least in part on second data associated with the portion of the second multichannel data structure and the augmented geometric data, wherein the first augmentation is distinct from the second augmentation: determining a second dataset comprising an augmented multichannel data structure based at least in part on the augmented geometric data and the augmented non-geometric data: determining a top-down image based at least in part on the augmented multichannel data structure; and training a machine-learned (ML) model to perform object detection based at least in part on the top-down image.

B: The system of paragraph A, wherein the indication of the significant condition comprises and indication of a transmission to a remote operator from a vehicle traversing the environment.

C: The system of paragraph A or B, wherein the operations further comprise: executing the ML model using a simulation dataset comprising parameterized scenarios: determining an ML model execution metric based at least in part on executing the ML model using the simulation dataset; and validating the second dataset based at least in part on determining that the ML model execution metric meets or exceeds a threshold metric.

D: The system of any of paragraphs A-C, wherein: the first data associated with the portion of the second multichannel data structure comprises geometric data of a frame associated with the portion of the second multichannel data structure; and determining the augmented geometric data comprises modifying one or more values associated with the geometric data of the frame to determine an augmented frame.

E: The system of any of paragraphs A-D, wherein: the second data associated with the portion of the second multichannel data structure comprises sensor data associated with a detection associated with the portion of the second multichannel data structure; and determining the augmented non-geometric data comprises modifying one or more values associated with the sensor data based at least in part on the augmented geometric data.

F: One or more non-transitory computer-readable media storing instructions that, when executed by one or more processors, perform operations comprising: receiving a first dataset comprising data representing detections in an environment and an indication of a significant condition: determining a property of a portion of the first dataset associated with the indication: determining a portion of a second dataset associated with the property: based at least in part on determining the portion of the second dataset, augmenting the portion of the second dataset to determine augmented data: determining an augmented dataset based at least in part on the augmented data and the second dataset; and training a machine-learned (ML) model to perform object detection based at least in part on the augmented dataset.

G: The one or more non-transitory computer-readable media of paragraph F, wherein augmenting the portion of the second dataset to determine the augmented data comprises: determining a detection associated with the portion of the second dataset: determining sensor data associated with the detection; and modifying the sensor data to determine the augmented data.

H: The one or more non-transitory computer-readable media of paragraph F or G, wherein augmenting the portion of the second dataset to determine the augmented data comprises: modifying geometric data associated with the portion of the second dataset to determine augmented geometric data; and modifying kinematic data associated with the portion of the second dataset based at least in part on the augmented geometric data to determine the augmented data.

I: The one or more non-transitory computer-readable media of any of paragraphs F-H, wherein augmenting the portion of the second dataset to determine the augmented data comprises: determining a plurality of detections associated with the portion of the second dataset: randomly selecting a detection from among the plurality of detections; and modifying detection data associated with the detection to determine the augmented data.

J: The one or more non-transitory computer-readable media of any of paragraphs F-I, wherein the first dataset is a same dataset as the second dataset.

K: The one or more non-transitory computer-readable media of any of paragraphs F-J, wherein the property is one or more of: a type of object: a vehicle location: a vehicle velocity: a vehicle acceleration: a vehicle condition; or an environmental condition.

L: The one or more non-transitory computer-readable media of any of paragraphs F-K, wherein: the operations further comprise determining a noise value by sampling input noise based at least in part on the portion of the second dataset; and augmenting the portion of the second dataset to determine the augmented data comprises modifying a value associated with the portion of the second dataset by adding the noise value to the value to determine the augmented data.

M: The one or more non-transitory computer-readable media of claim 6, any of paragraphs F-L, wherein augmenting the portion of the second dataset to determine the augmented data comprises setting a value associated with the portion of the second dataset to zero to determine the augmented data.

N: The one or more non-transitory computer-readable media of any of paragraphs F-M, wherein: the property comprises a type of object; and augmenting the portion of the second dataset to determine the augmented data comprises increasing a loss value for one or more detections associated with the portion of the second dataset to determine the augmented data.

O: A method comprising: receiving first data representing object detections in an environment: determining an indication of a significant condition represented in the first data: determining a portion of the first data associated with the indication; determining a property of a detection represented in the portion of the first data; determining a portion of second data associated with the property: augmenting the portion of the second data to determine augmented data; and training a machine-learned (ML) model to perform object detection based at least in part on the augmented data.

P: The method of paragraphs O, wherein: the property comprises an object classification; and augmenting the portion of the second data to determine the augmented data comprises: generating a binary mask based on the object classification; and increasing a loss value in the portion of the second data for one or more object detections represented in the portion of the second data and associated with the object classification using the binary mask.

Q: The method of paragraphs O or P, further comprising: executing the ML model using a simulation dataset comprising parameterized scenarios: determining an ML model execution metric based at least in part on executing the ML model using the simulation dataset: determining a second ML model execution metric associated with executing a second ML model using the simulation dataset; and validating the augmented data based at least in part on determining that the ML model execution metric meets or exceeds the second ML model execution metric.

R: The method of paragraph Q, wherein the ML model execution metric comprises data representing one or more of: object detections: object classifications; object intersections: or hazardous conditions.

S: The method of any of paragraphs O-R, wherein augmenting the portion of the second data to determine the augmented data comprises one or more of: reversing object position data associated with the portion of the second data about an axis of a top-down representation of the portion of the second data: rotating the object position data associated with the portion of the second data about a point in the top-down representation of the portion of the second data: or translating the object position data associated with the portion of the second data in in the top-down representation of the portion of the second data.

T: The method of any of paragraphs O-S, further comprising transmitting the ML model to a computing system configured to control a vehicle based at least in part on output received from the ML model.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by the one or more processors, wherein the instructions, when executed, cause the system to perform operations comprising:
receiving a first dataset comprising a first multichannel data structure representing an environment, the first multichannel data structure comprising a plurality of channels representing detections in the environment and one or more indications of a significant condition represented in the first multichannel data structure;
determining a property of a portion of the first multichannel data structure associated with an indication of the significant condition;
determining a portion of a second multichannel data structure associated with the property;
based at least in part on determining the portion of a second multichannel data structure:
determining augmented geometric data using a first augmentation based at least in part on first data associated with the portion of the second multichannel data structure; and
determining augmented non-geometric data using a second augmentation based at least in part on second data associated with the portion of the second multichannel data structure and the augmented geometric data, wherein the first augmentation is distinct from the second augmentation;
determining a second dataset comprising an augmented multichannel data structure based at least in part on the augmented geometric data and the augmented non-geometric data;
determining a top-down image based at least in part on the augmented multichannel data structure; and
training a machine-learned (ML) model to perform object detection based at least in part on the top-down image.

2. The system of claim 1, wherein the indication of the significant condition comprises and indication of a transmission to a remote operator from a vehicle traversing the environment.

3. The system of claim 1, wherein the operations further comprise:
executing the ML model using a simulation dataset comprising parameterized scenarios;
determining an ML model execution metric based at least in part on executing the ML model using the simulation dataset; and
validating the second dataset based at least in part on determining that the ML model execution metric meets or exceeds a threshold metric.

4. The system of claim 1, wherein:
the first data associated with the portion of the second multichannel data structure comprises geometric data of a frame associated with the portion of the second multichannel data structure; and
determining the augmented geometric data comprises modifying one or more values associated with the geometric data of the frame to determine an augmented frame.

5. The system of claim 1, wherein:
the second data associated with the portion of the second multichannel data structure comprises sensor data associated with a detection associated with the portion of the second multichannel data structure; and
determining the augmented non-geometric data comprises modifying one or more values associated with the sensor data based at least in part on the augmented geometric data.

6. One or more non-transitory computer-readable media storing instructions that, when executed by one or more processors, perform operations comprising:
receiving a first dataset comprising data representing detections in an environment and an indication of a significant condition;
determining a property of a portion of the first dataset associated with the indication;
determining a portion of a second dataset associated with the property;
based at least in part on determining the portion of the second dataset, augmenting the portion of the second dataset to determine augmented data;
determining an augmented dataset based at least in part on the augmented data and the second dataset; and
training a machine-learned (ML) model to perform object detection based at least in part on the augmented dataset.

7. The one or more non-transitory computer-readable media of claim 6, wherein augmenting the portion of the second dataset to determine the augmented data comprises:
determining a detection associated with the portion of the second dataset;
determining sensor data associated with the detection; and
modifying the sensor data to determine the augmented data.

8. The one or more non-transitory computer-readable media of claim 6, wherein augmenting the portion of the second dataset to determine the augmented data comprises:
modifying geometric data associated with the portion of the second dataset to determine augmented geometric data; and modifying kinematic data associated with the portion of the second dataset based at least in part on the augmented geometric data to determine the augmented data.

9. The one or more non-transitory computer-readable media of claim 6, wherein augmenting the portion of the second dataset to determine the augmented data comprises:
determining a plurality of detections associated with the portion of the second dataset;
randomly selecting a detection from among the plurality of detections; and
modifying detection data associated with the detection to determine the augmented data.

10. The one or more non-transitory computer-readable media of claim 6, wherein the first dataset is a same dataset as the second dataset.

11. The one or more non-transitory computer-readable media of claim 6, wherein the property is one or more of:
a type of object;
a vehicle location;
a vehicle velocity;
a vehicle acceleration;
a vehicle condition; or
an environmental condition.

12. The one or more non-transitory computer-readable media of claim 6, wherein:
the operations further comprise determining a noise value by sampling input noise based at least in part on the portion of the second dataset; and
augmenting the portion of the second dataset to determine the augmented data comprises modifying a value associated with the portion of the second dataset by adding the noise value to the value to determine the augmented data.

13. The one or more non-transitory computer-readable media of claim 6, wherein augmenting the portion of the second dataset to determine the augmented data comprises setting a value associated with the portion of the second dataset to zero to determine the augmented data.

14. The one or more non-transitory computer-readable media of claim 6, wherein:
the property comprises a type of object; and
augmenting the portion of the second dataset to determine the augmented data comprises increasing a loss value for one or more detections associated with the portion of the second dataset to determine the augmented data.

15. A method comprising:
receiving first data representing object detections in an environment;
determining an indication of a significant condition represented in the first data;
determining a portion of the first data associated with the indication;
determining a property of a detection represented in the portion of the first data;
determining a portion of second data associated with the property;
augmenting the portion of the second data to determine augmented data; and
training a machine-learned (ML) model to perform object detection based at least in part on the augmented data.

16. The method of claim 15, wherein:
the property comprises an object classification; and
augmenting the portion of the second data to determine the augmented data comprises:
generating a binary mask based on the object classification; and
increasing a loss value in the portion of the second data for one or more object detections represented in the portion of the second data and associated with the object classification using the binary mask.

17. The method of claim 15, further comprising:
executing the ML model using a simulation dataset comprising parameterized scenarios;
determining an ML model execution metric based at least in part on executing the ML model using the simulation dataset;
determining a second ML model execution metric associated with executing a second ML model using the simulation dataset; and
validating the augmented data based at least in part on determining that the ML model execution metric meets or exceeds the second ML model execution metric.

18. The method of claim 17, wherein the ML model execution metric comprises data representing one or more of:
object detections;
object classifications;
object intersections; or
hazardous conditions.

19. The method of claim 15, wherein augmenting the portion of the second data to determine the augmented data comprises one or more of:
reversing object position data associated with the portion of the second data about an axis of a top-down representation of the portion of the second data;
rotating the object position data associated with the portion of the second data about a point in the top-down representation of the portion of the second data; or
translating the object position data associated with the portion of the second data in in the top-down representation of the portion of the second data.

20. The method of claim 15, further comprising transmitting the ML model to a computing system configured to control a vehicle based at least in part on output received from the ML model.

* * * * *